(12) United States Patent
Kusens et al.

(10) Patent No.: US 10,297,096 B2
(45) Date of Patent: May 21, 2019

(54) ELECTRONIC IDENTIFICATION, LOCATION TRACKING, COMMUNICATION AND NOTIFICATION SYSTEM WITH BEACON CLUSTERING

(71) Applicant: COLLATERAL OPPORTUNITIES, LLC, Wilmington, DE (US)

(72) Inventors: Bruce Howard Kusens, North Miami Beach, FL (US); Michael Kusens, Cooper City, FL (US)

(73) Assignee: COLLATERAL OPPORTUNITIES, LLC, Wilmington, DE (US)

( * ) Notice: Subject to any disclaimer, the term of this patent is extended or adjusted under 35 U.S.C. 154(b) by 0 days.

(21) Appl. No.: 16/180,839

(22) Filed: Nov. 5, 2018

(65) Prior Publication Data
US 2019/0073849 A1    Mar. 7, 2019

Related U.S. Application Data

(63) Continuation of application No. 15/897,114, filed on Feb. 14, 2018, now Pat. No. 10,121,299, which is a
(Continued)

(51) Int. Cl.
*G07C 9/00* (2006.01)
*H04W 4/02* (2018.01)
(Continued)

(52) U.S. Cl.
CPC ..... *G07C 9/00309* (2013.01); *G06F 16/9535* (2019.01); *G07C 9/00103* (2013.01);
(Continued)

(58) Field of Classification Search
CPC ...... G07C 9/00309; G07C 2009/00769; G07C 9/00111; G07C 9/00571; G07C 9/00007;
(Continued)

(56) References Cited

U.S. PATENT DOCUMENTS

| | | | |
|---|---|---|---|
| 9,100,766 B2 * | 8/2015 | Soulodre | H04S 1/002 |
| 2008/0144864 A1 * | 6/2008 | Huon | H04R 1/20 |
| | | | 381/305 |

* cited by examiner

*Primary Examiner* — Mark S Blouin
(74) *Attorney, Agent, or Firm* — Daniel S. Polley, P.A.

(57) ABSTRACT

A method and system that allows authorized individuals access into controlled access locations and the ability to grant temporary and limited access to guests into these locations. The method and system allows for navigational services to be provided to members and guests, and real-time tracking and confirmation to members and administrators that guests have arrived at their destination and did not enter any unauthorized areas. The method preferably can work through a system of wireless radio, sound and/or light-based beacons communicating with member and guest's electronic devices. Members and administrators can send one or more temporary electronic access keys to a guest's smartphone or other electronic device. Wireless radio, sound and/or light-based beacons provide an access control and location tracking system with real-time data about the member and guest whereabouts, allowing for the confirmation and tracking. Also provided is a system and method for identifying a customer's location at a business and provide notification to a company representative upon arrival of the customer at the business location. Real-time location determinations for the customer and customer location tracking can be provided. One or more wireless beacons communicate with the customer's electronic device. The beacons provide the system with real-time data about the customer's whereabouts, allowing for the confirmation and tracking of the customer at the location. A first non-limiting example of use, include a company that provides food and beverage allowing the customer to place an order for food and beverages on their electronic device and having the order delivered to the person at their current location as determined by the system. Another non-limiting example includes a company using the
(Continued)

Registration of Member Device notification system to have assigned staff members notified of the customer's arrival.

14 Claims, 25 Drawing Sheets

Related U.S. Application Data continuation of application No. 15/845,417, filed on Dec. 18, 2017, now Pat. No. 9,984,521, which is a continuation-in-part of application No. 15/627,820, filed on Jun. 20, 2017, now Pat. No. 9,858,741, which is a continuation of application No. 15/286,753, filed on Oct. 6, 2016, now Pat. No. 9,691,206, which is a continuation of application No. 15/055,477, filed on Feb. 26, 2016, now Pat. No. 9,446,163, which is a continuation of application No. 14/827,222, filed on Aug. 14, 2015, now Pat. No. 9,424,699.

(60) Provisional application No. 62/037,684, filed on Aug. 15, 2014.

(51) Int. Cl.
*H04W 64/00* (2009.01)
*G06F 16/9535* (2019.01)

(52) U.S. Cl.
CPC ...... *G07C 9/00111* (2013.01); *G07C 9/00571* (2013.01); *G07C 9/00817* (2013.01); *H04W 4/02* (2013.01); *H04W 64/00* (2013.01); *G07C 2009/00388* (2013.01); *G07C 2009/00769* (2013.01); *G07C 2209/02* (2013.01)

(58) Field of Classification Search
CPC ...... G07C 2209/63; G07C 2009/00793; G07C 9/00896
USPC ........................................................ 340/5.61
See application file for complete search history.

FIGURE 1: Registration of Member Device
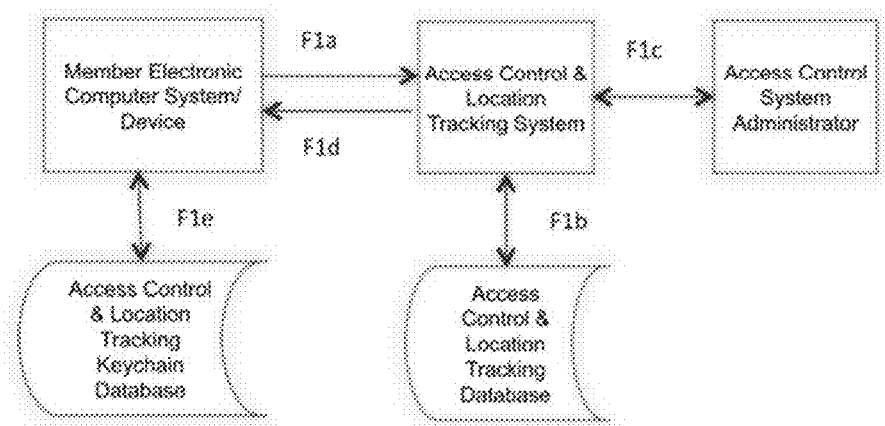
FIGURE 2: Sending Access Key to Guest Device
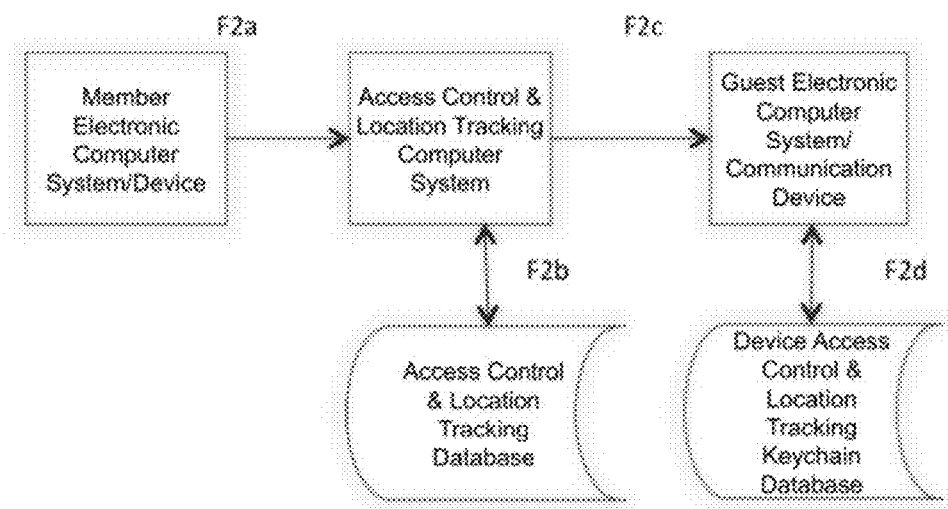

FIGURE 3: Determination of Access Rights
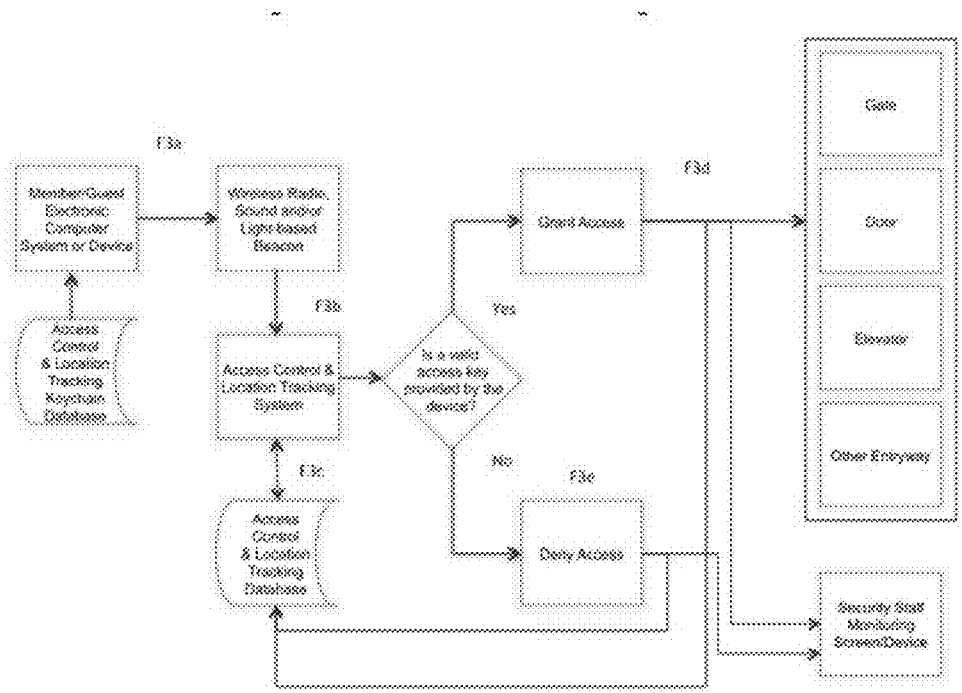
FIGURE 4: Determination of Authorized Location(s)
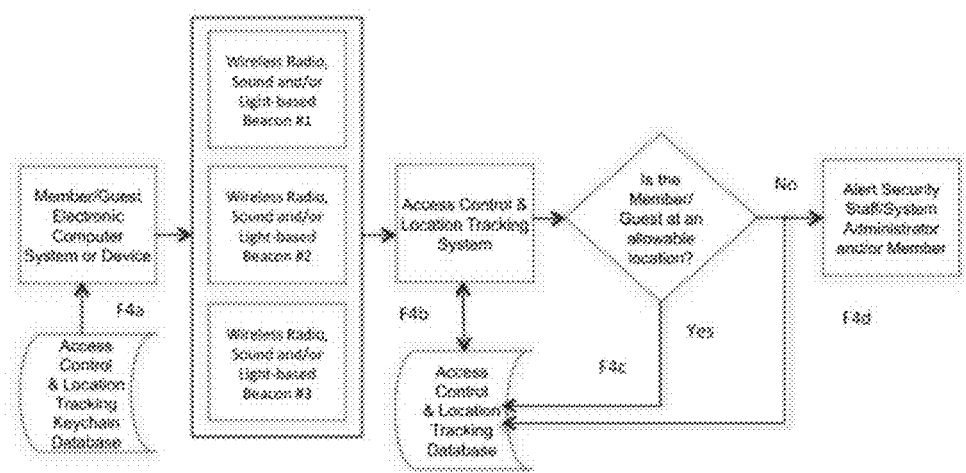

FIGURE 5: Determination of Arrival at Authorized Location(s)
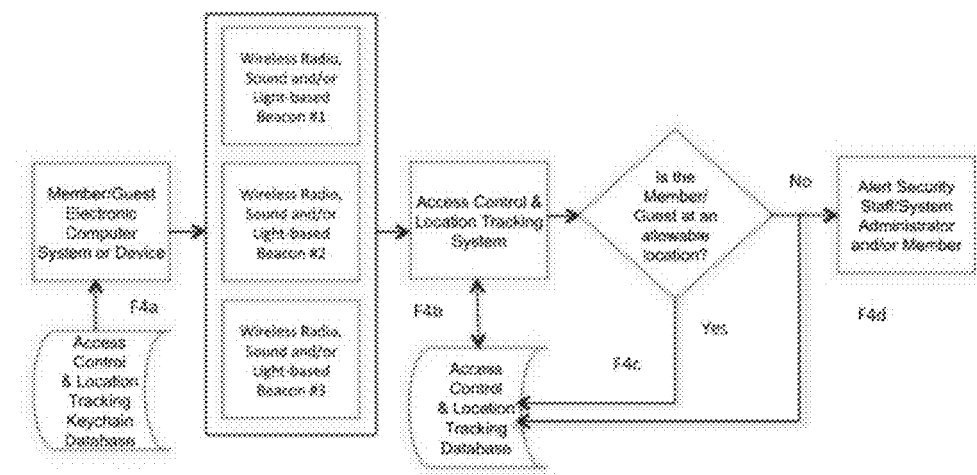
FIGURE 6: Determination of Location and Navigational Support
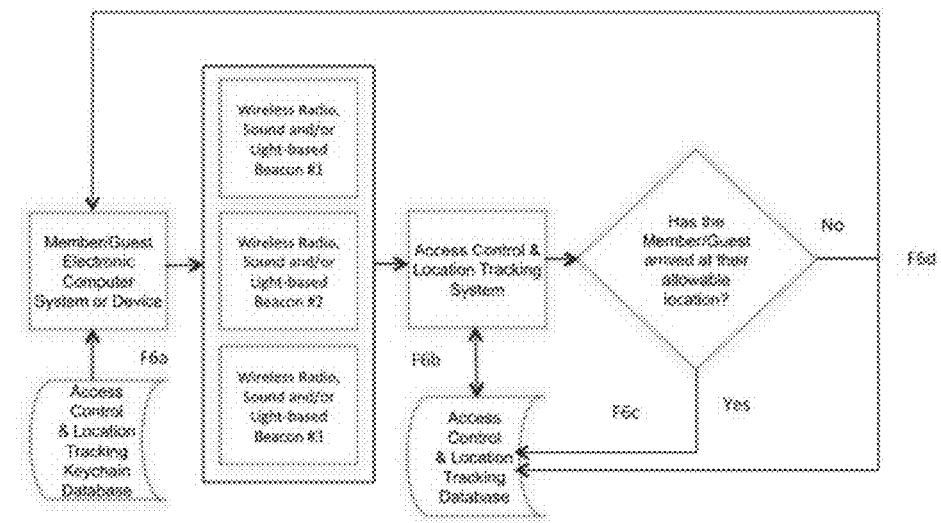

FIGURE 7: Access Control & Notification Rules Engine
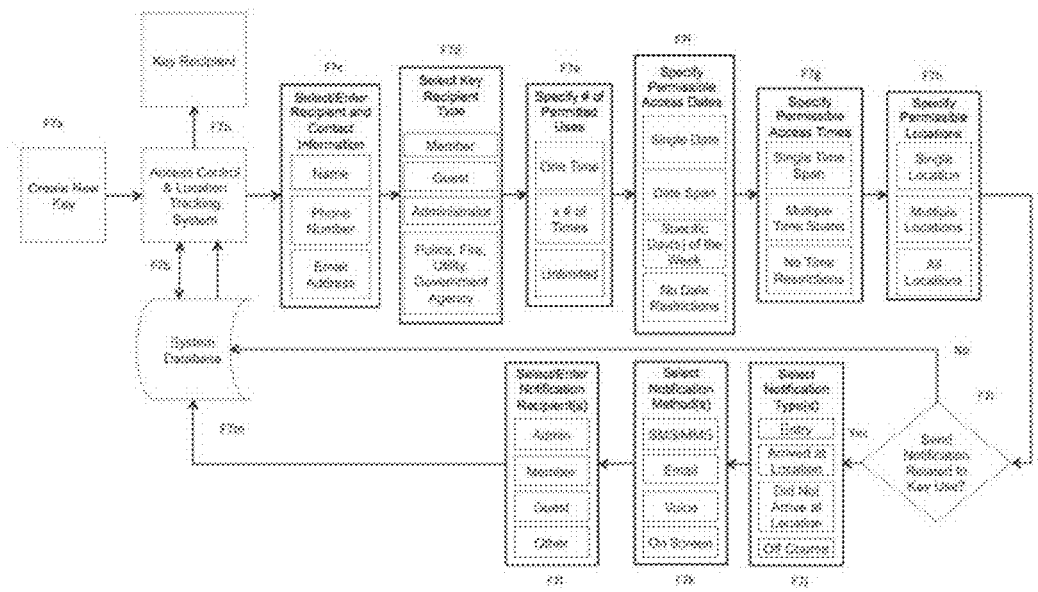
FIGURE 8: Storage of Keys in Keychain Database
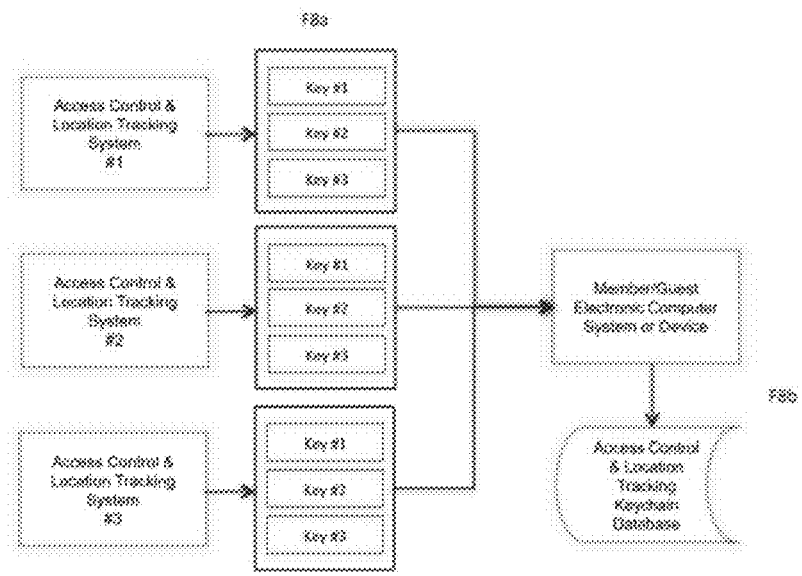

FIGURE 9: Manually Sending Keys from Device to Access Control & Location Tracking System
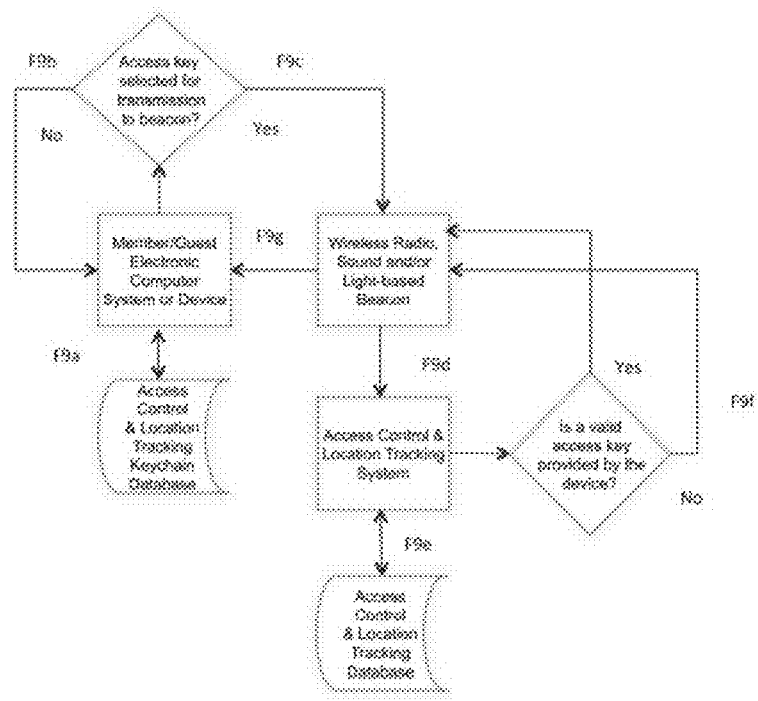

FIGURE 10: Auto-Prompting to Select a Key and Manual Key Selection to Send from Device to Access Control & Location Tracking System
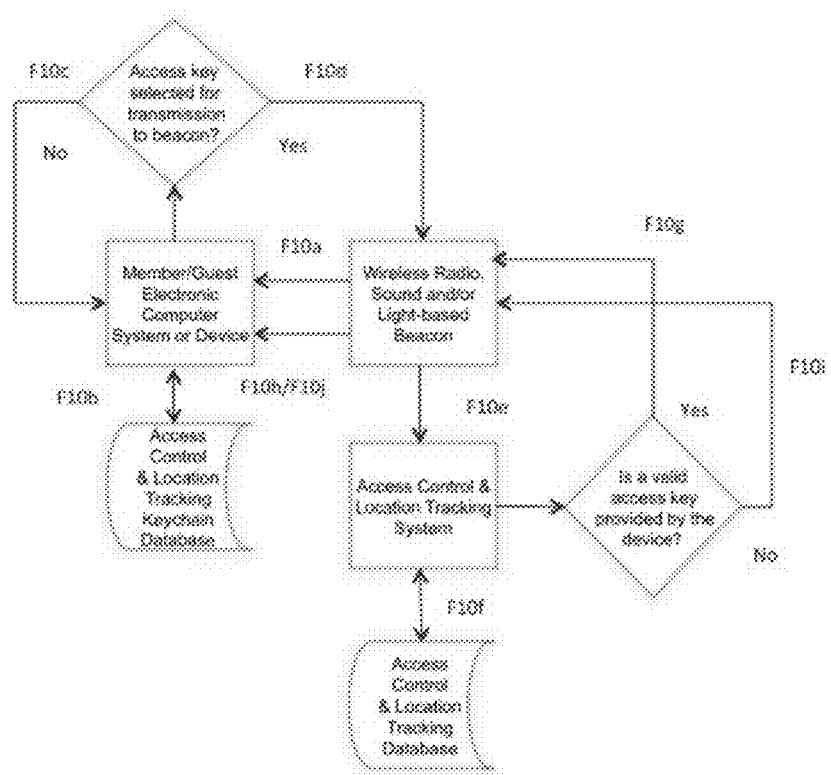

FIGURE 11: Auto-Prompting & Key Selection to Send from Device to Access Control & Location Tracking System
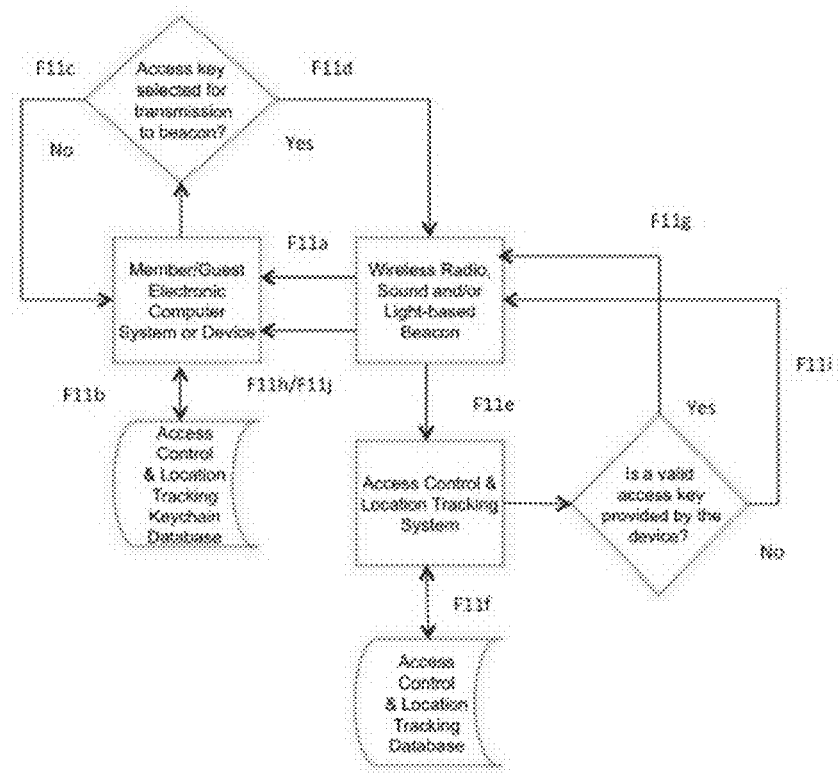
FIGURE 12: Process for a Guest to Request a Key from a Member
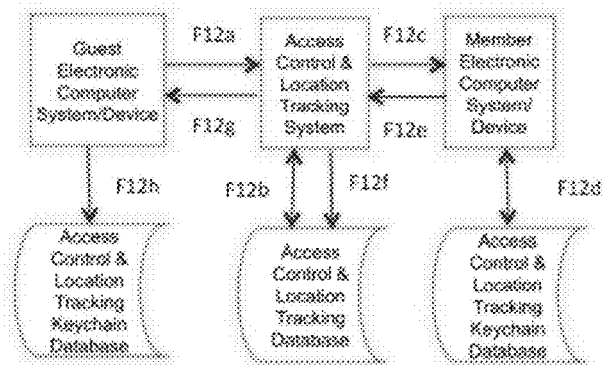

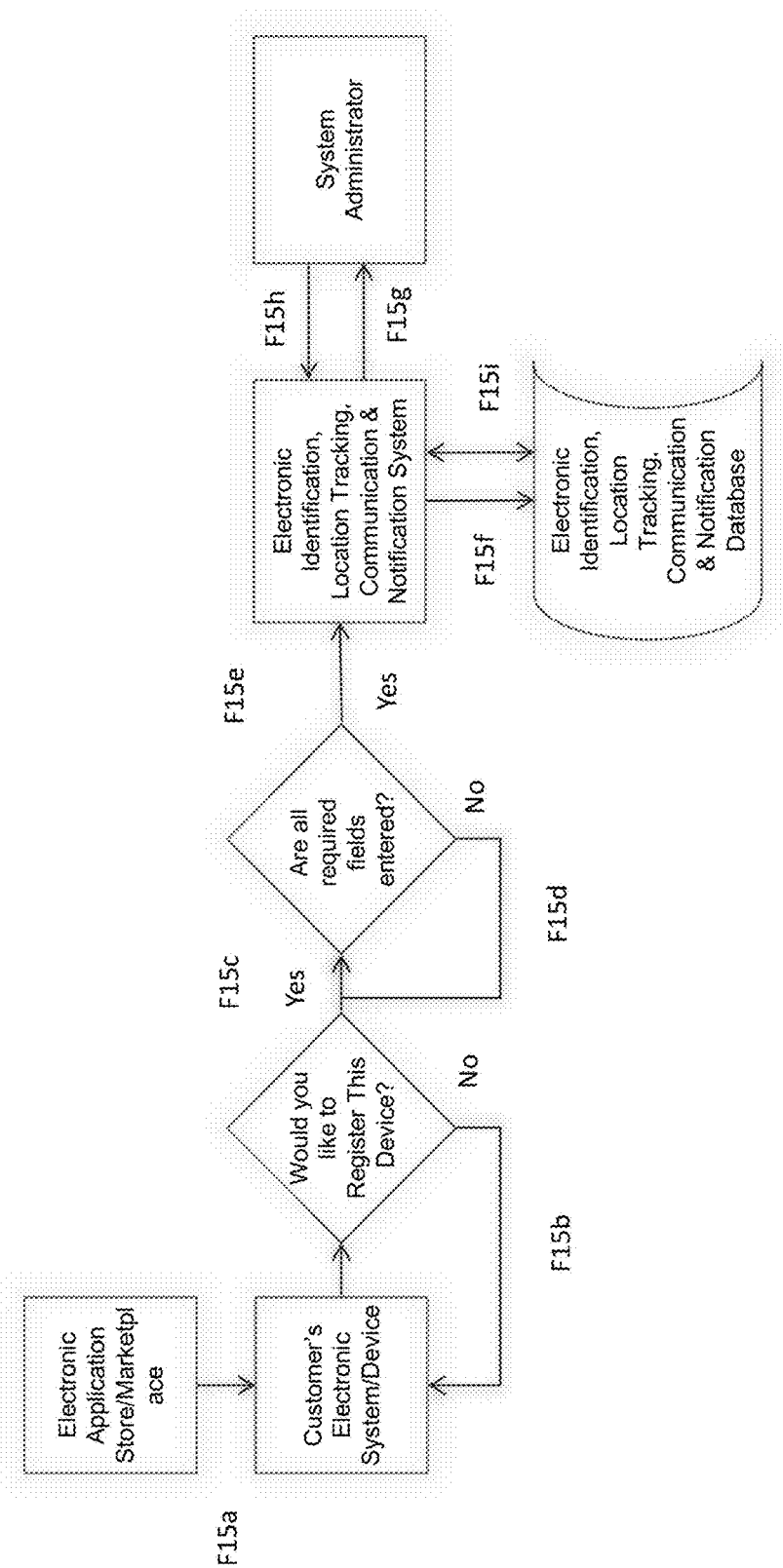

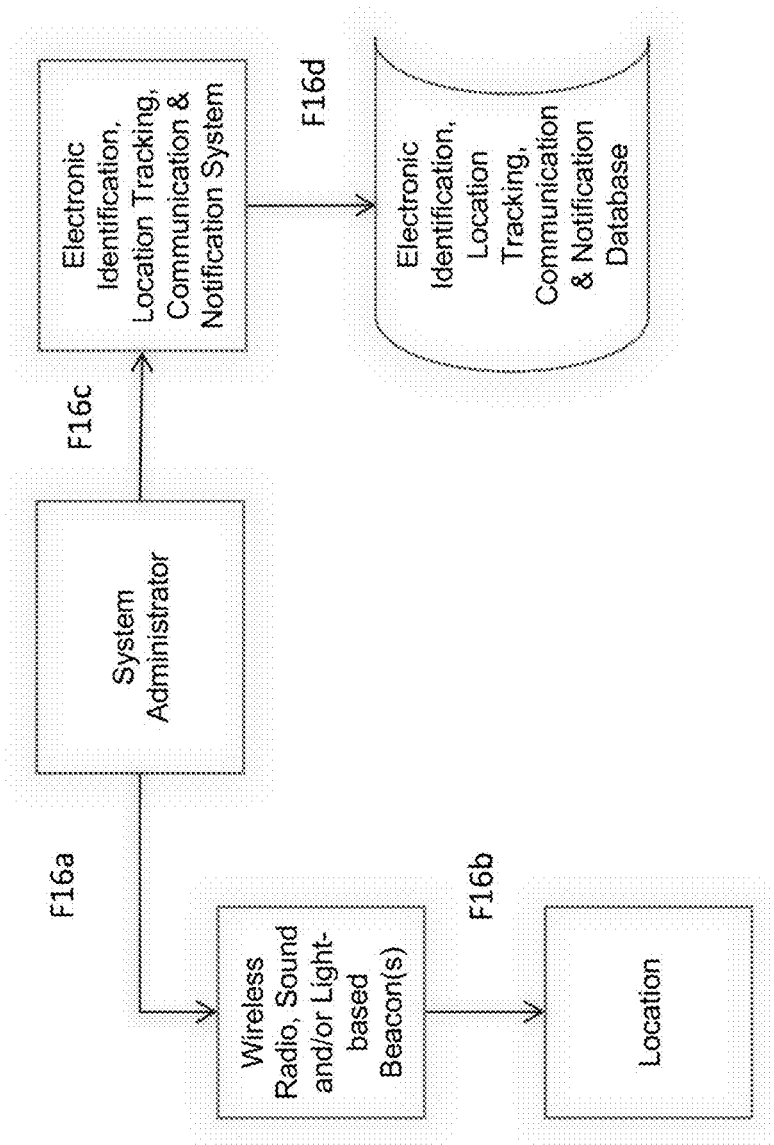

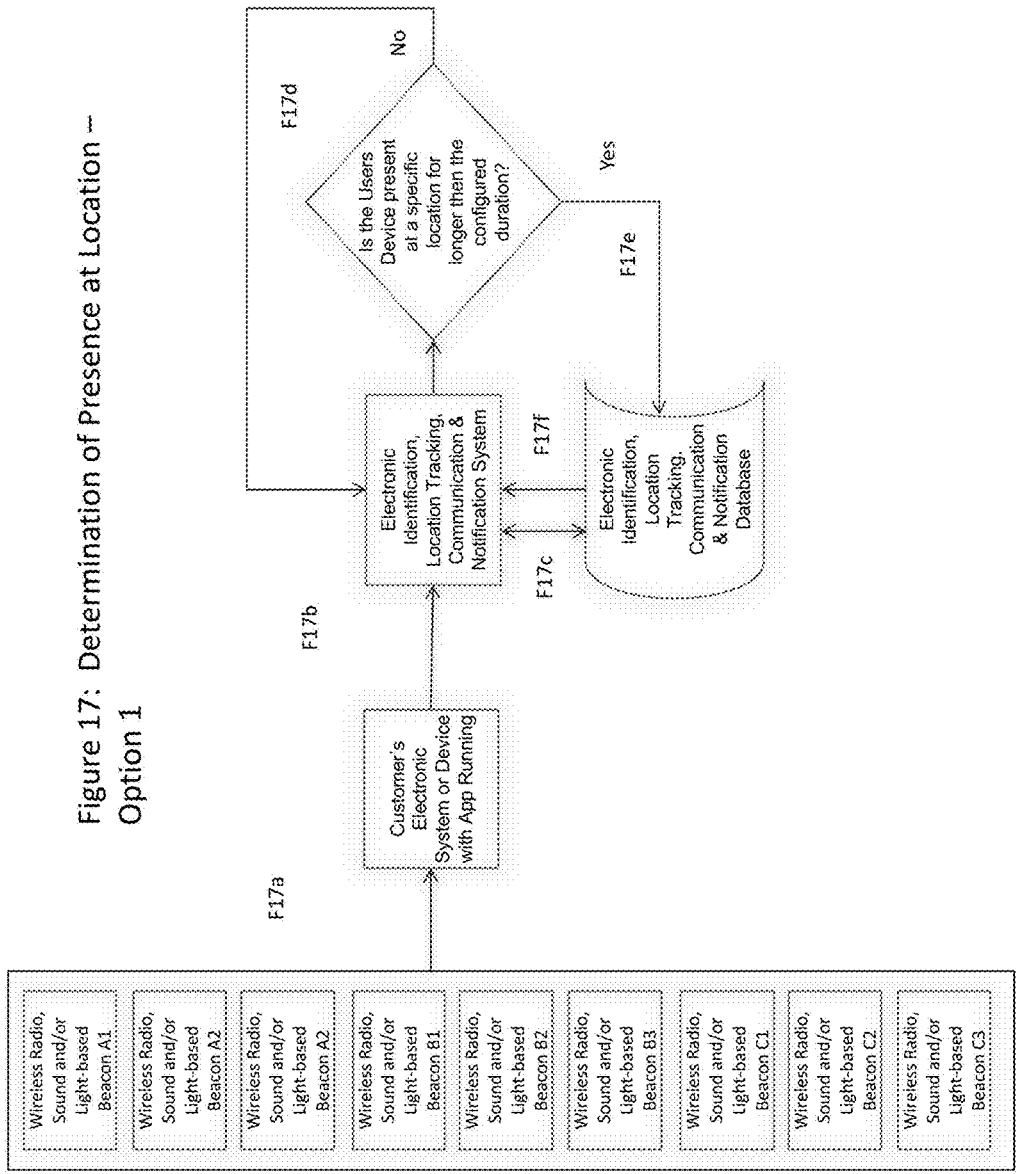
Figure 17: Determination of Presence at Location – Option 1

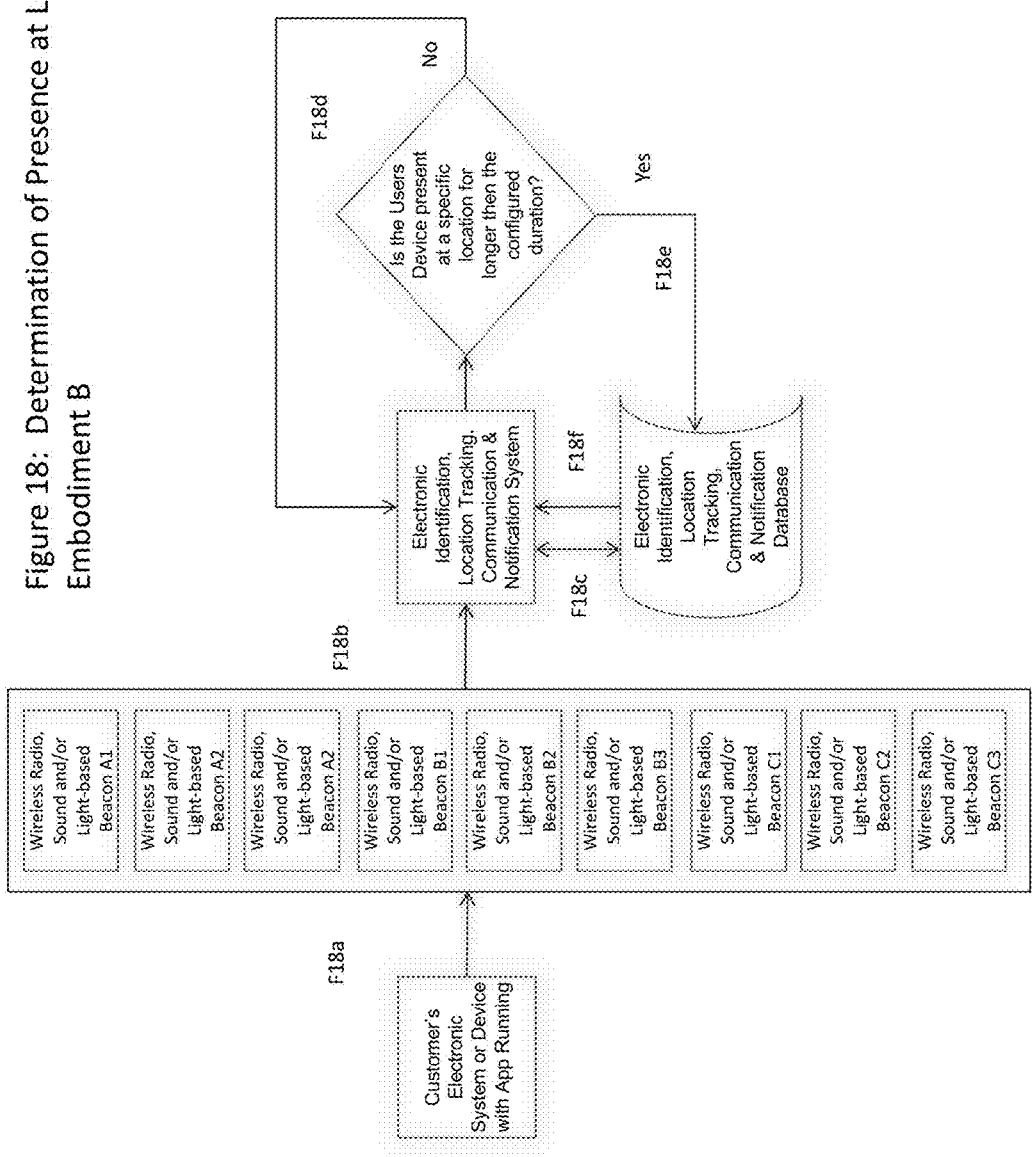

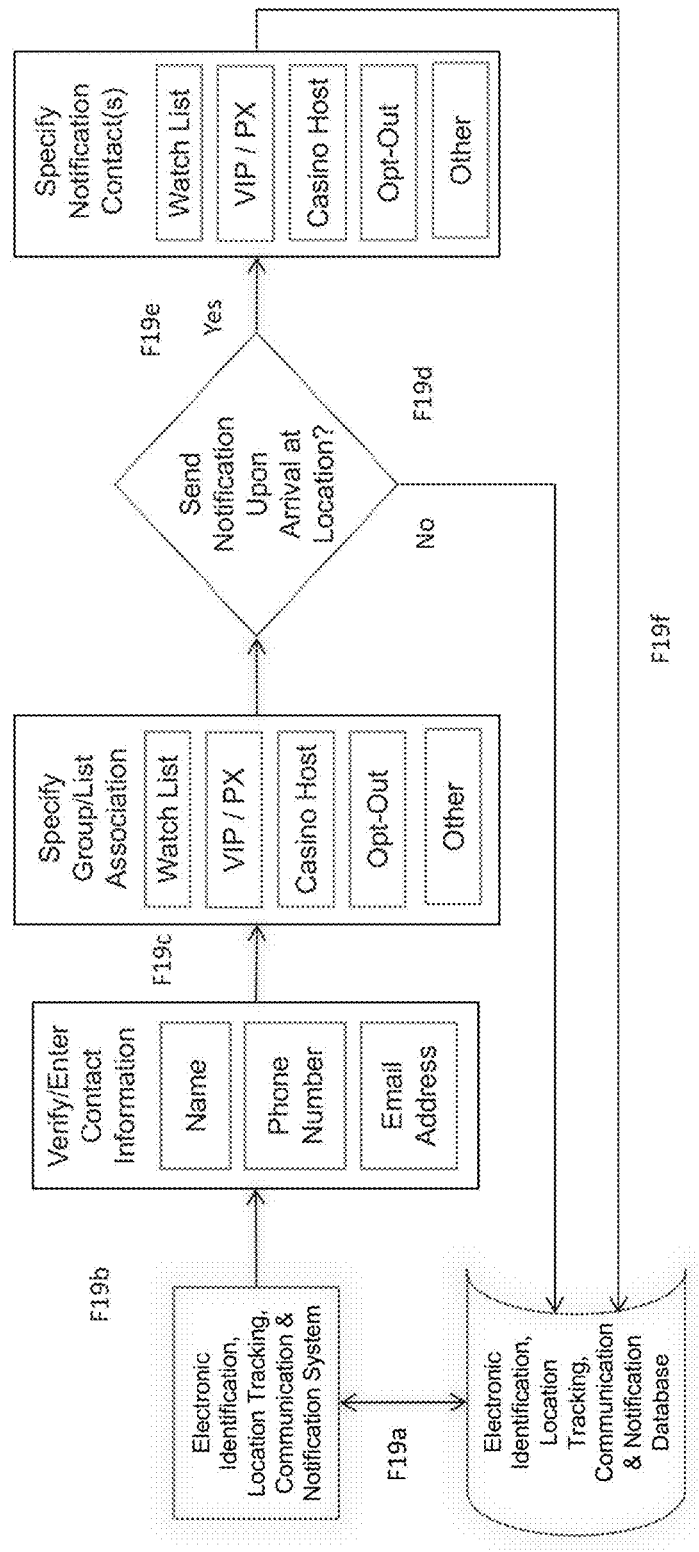
Figure 19: Notification Rules Engine

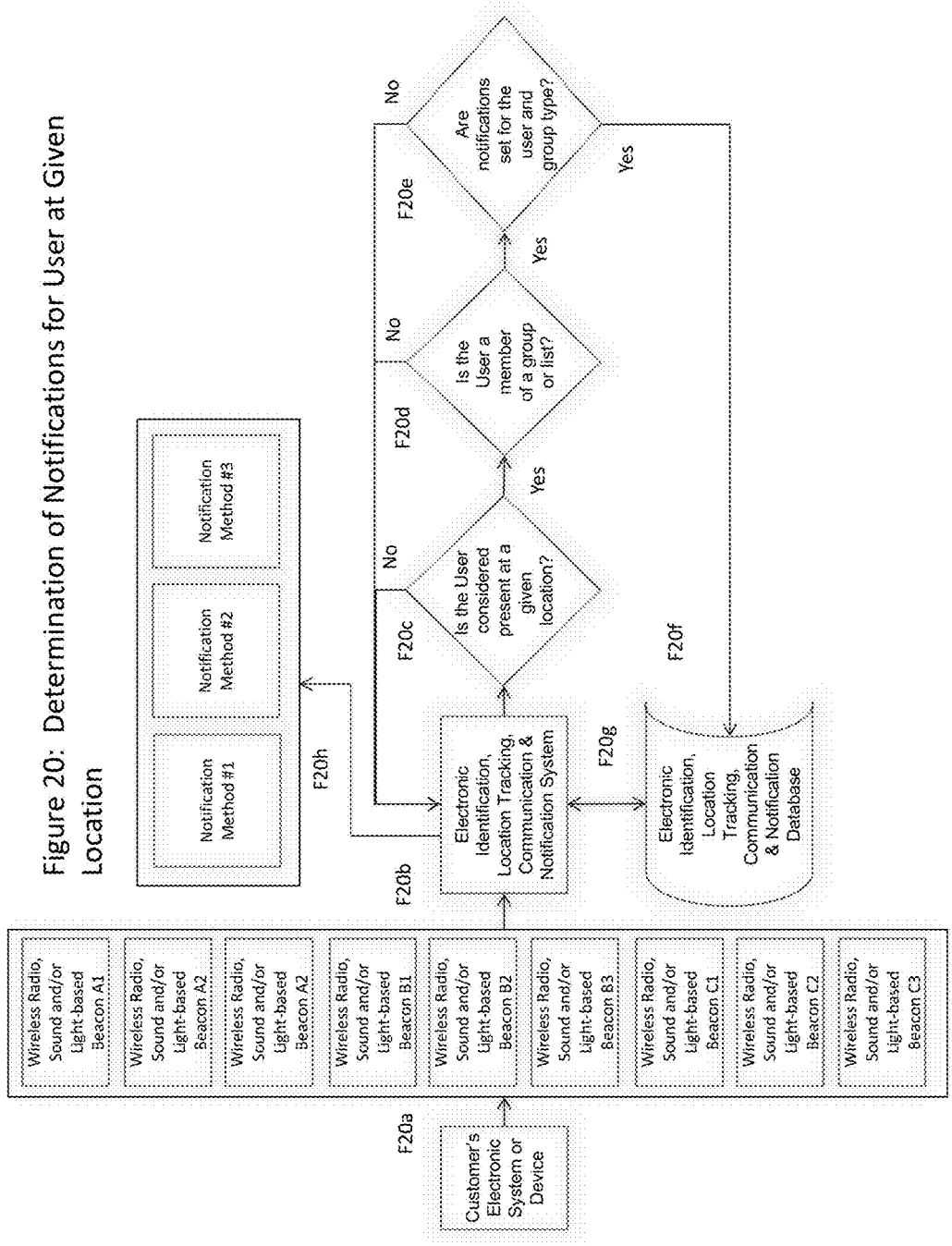

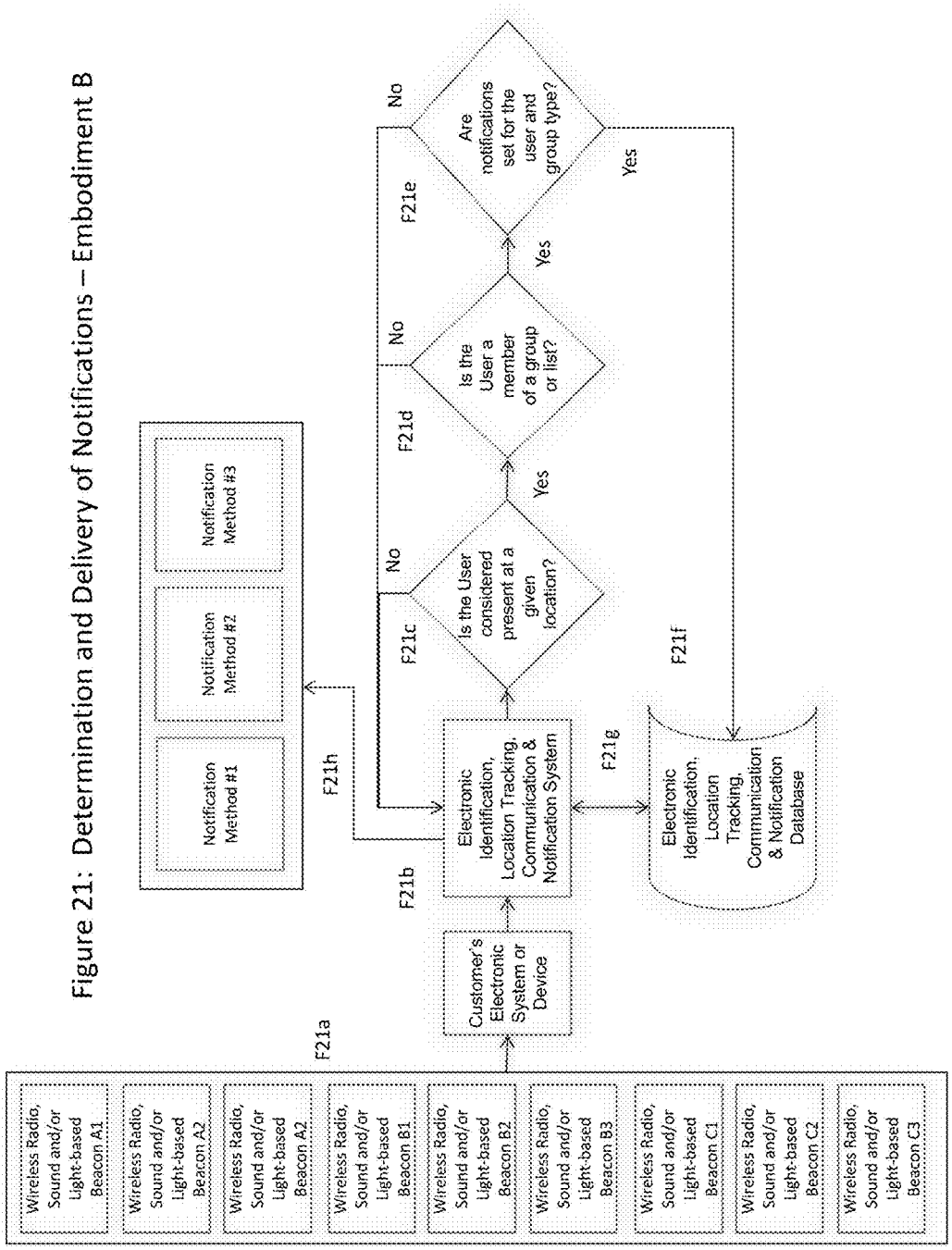
Figure 21: Determination and Delivery of Notifications – Embodiment B

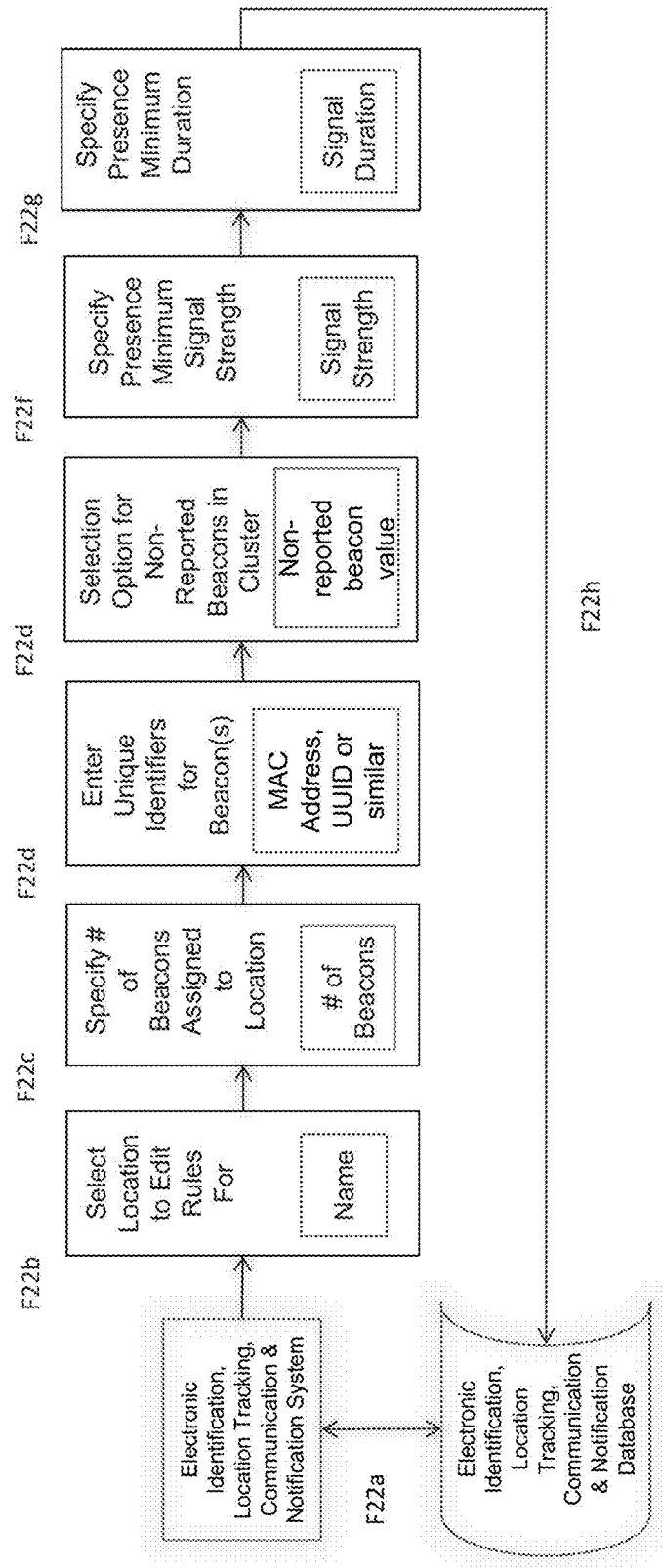
Figure 22: Presence Determination Rules Engine

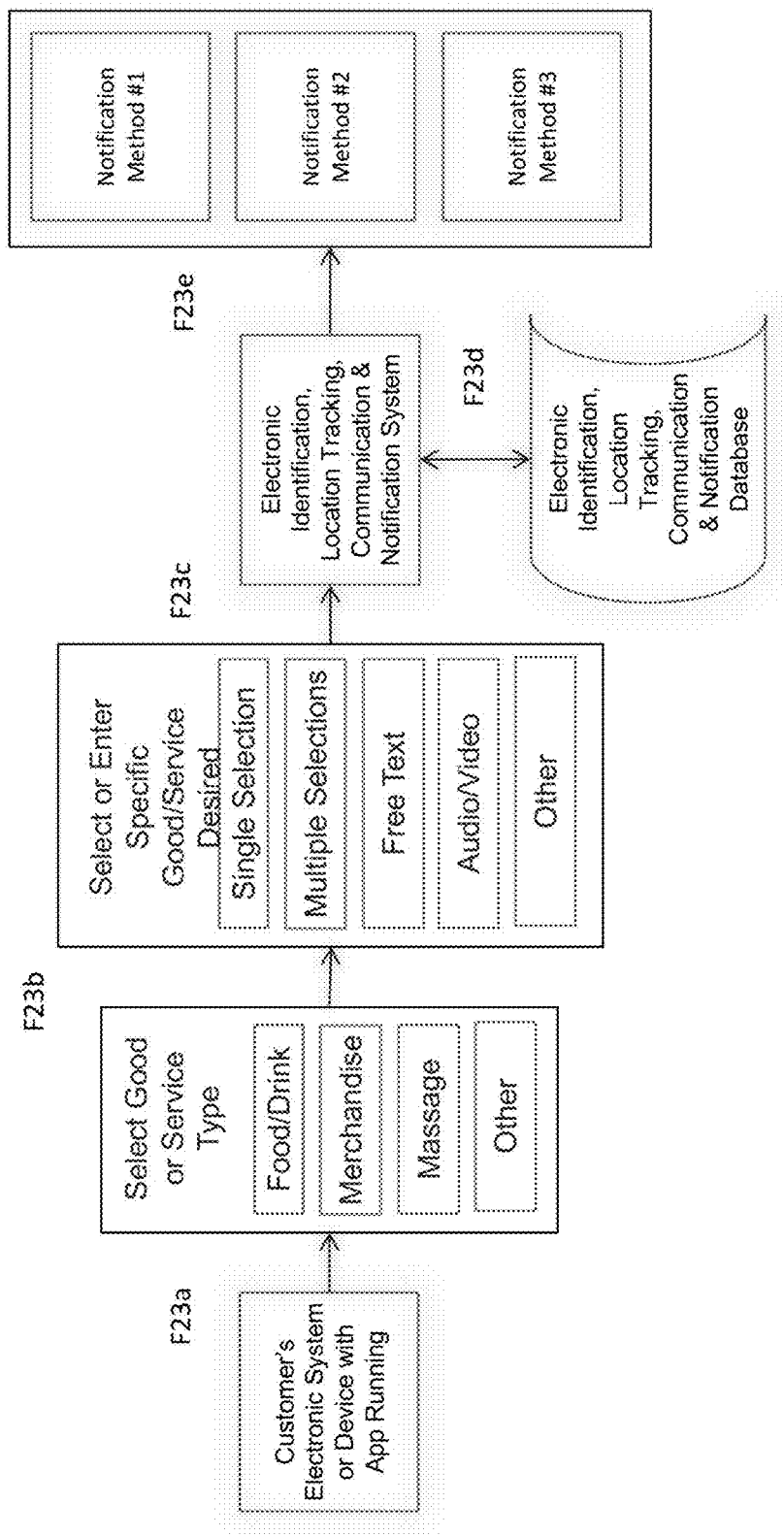
Figure 23: Process to Order Goods and/or Services from App

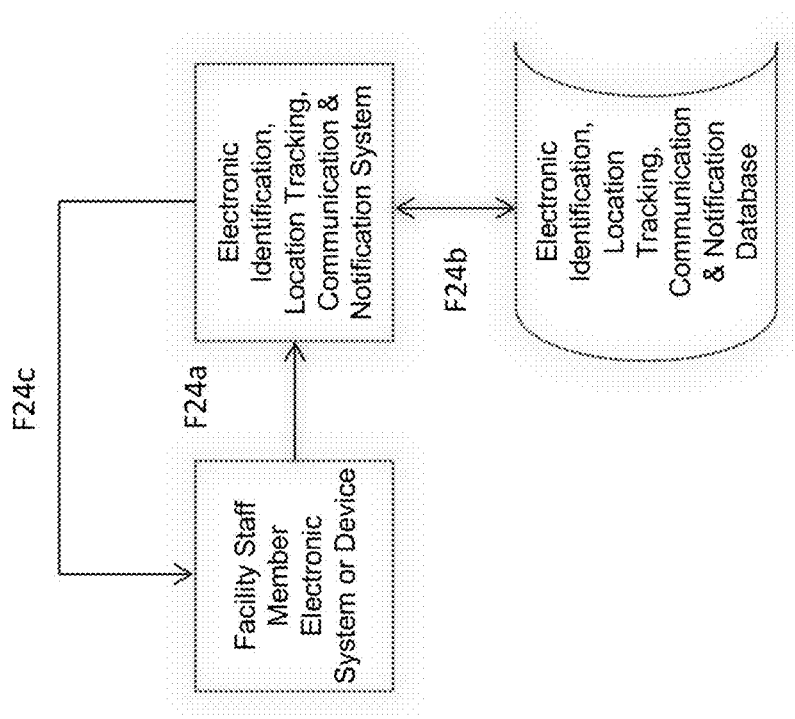
Figure 24: Delivery of Goods/Services to Current Location

Figure 25: Customer Opt-Out of Rating/Monitoring by Facility
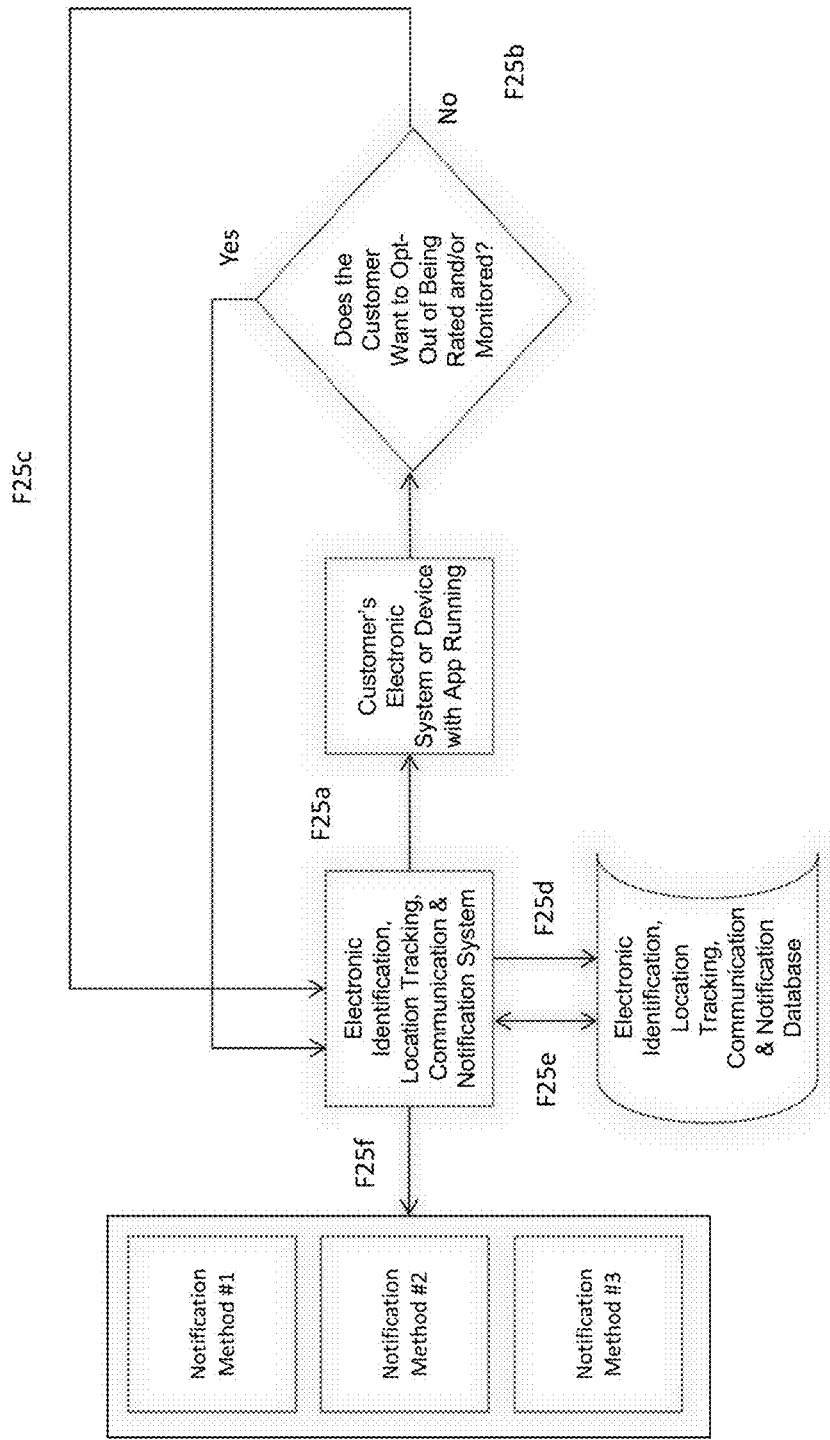

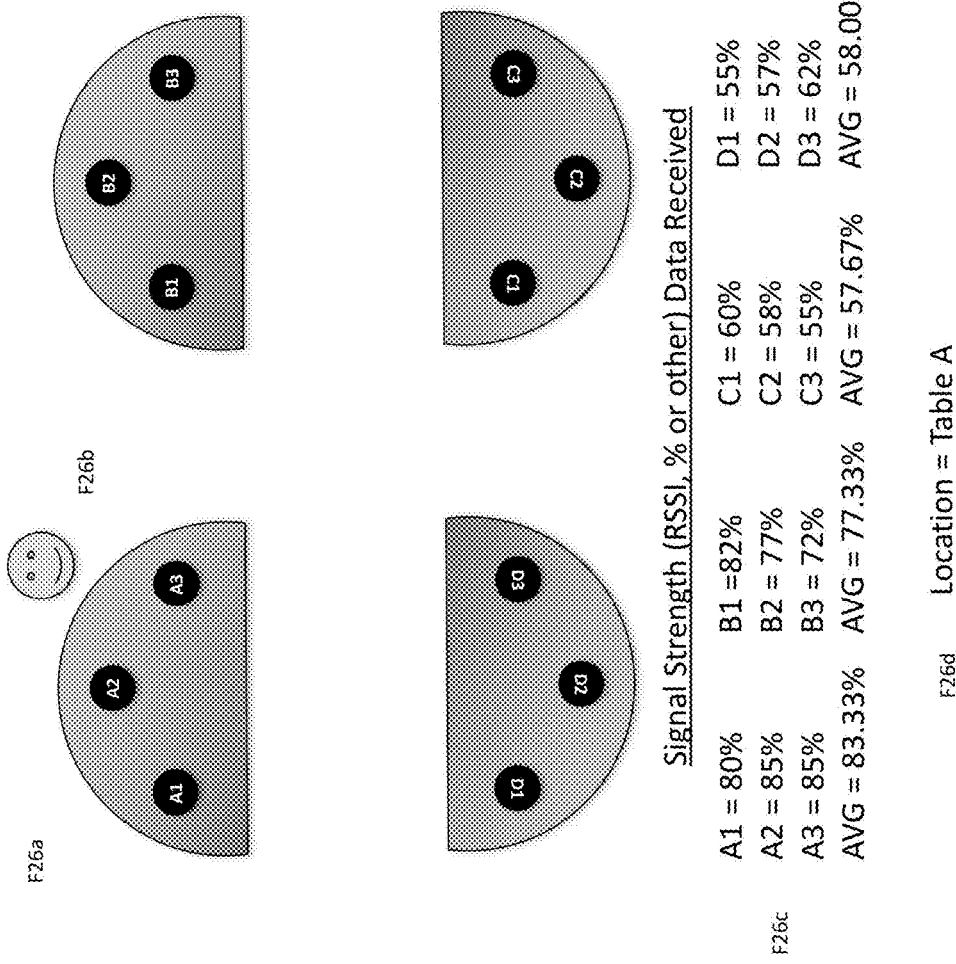
Figure 26: Sample of presence determination with Clustering of Beacons in a Location

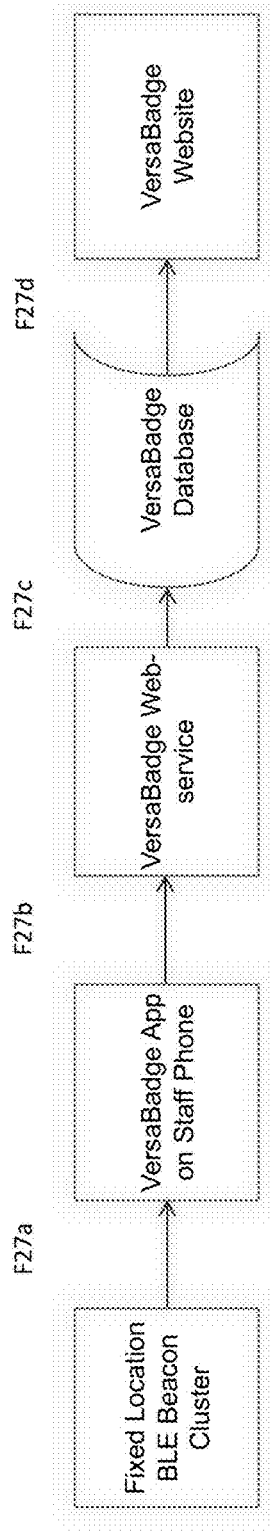
Figure 27: Location Determination for Staff / Visitors
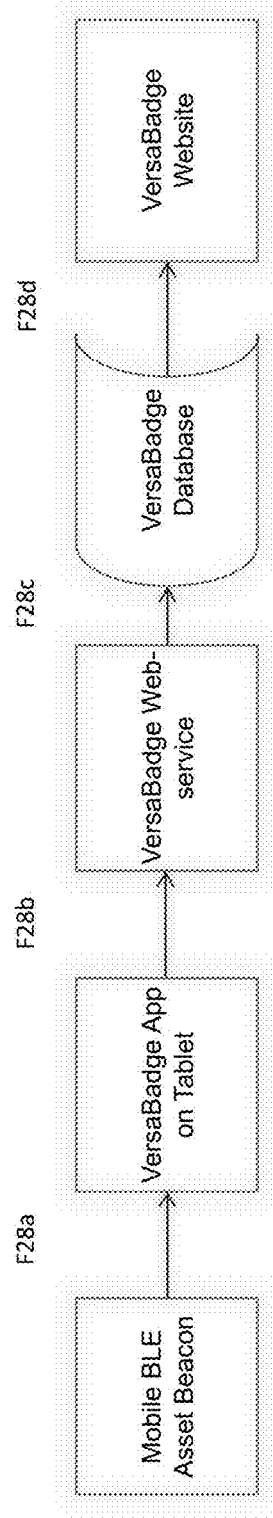
Figure 28: Location Determination for Assets

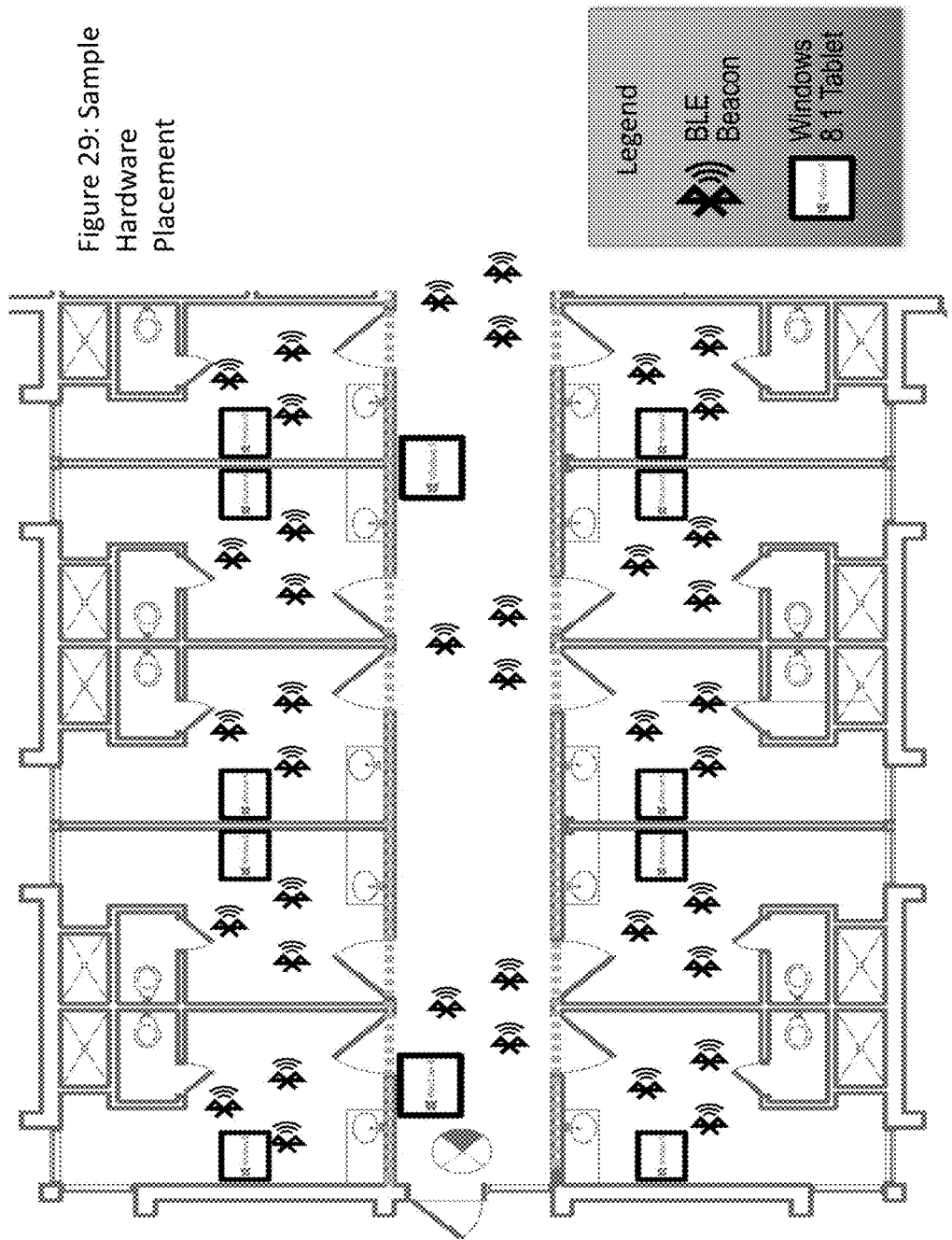

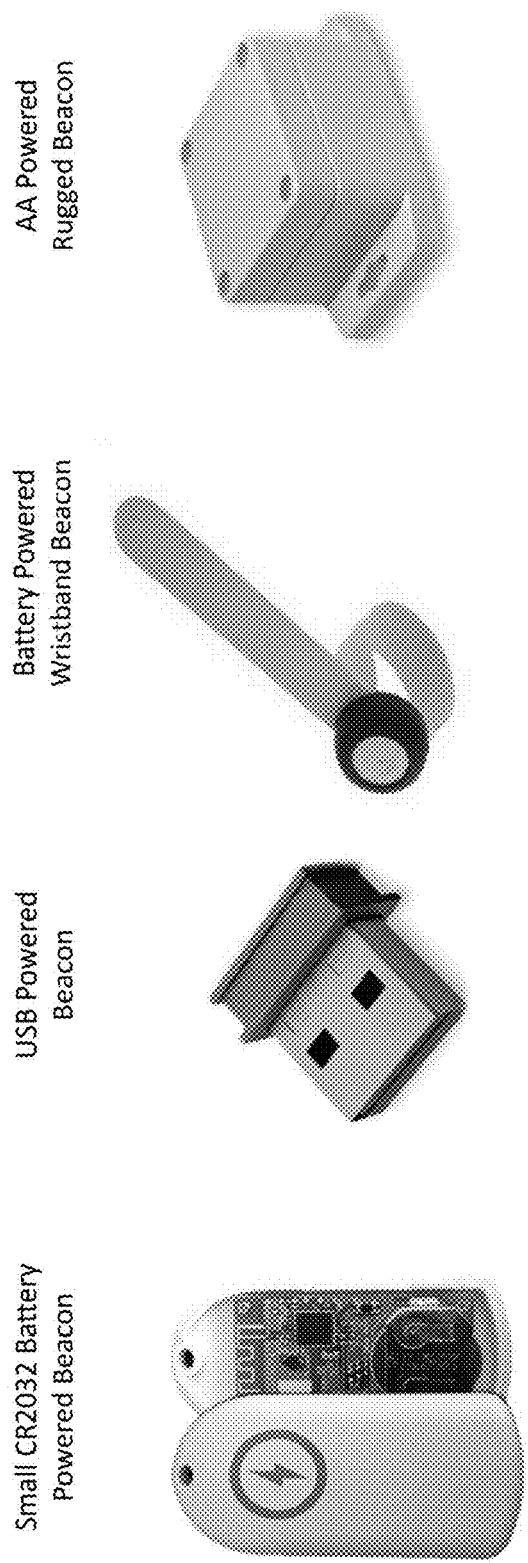
Figure 30: Exemplary Beacon Options / Form Factors

ELECTRONIC IDENTIFICATION, LOCATION TRACKING, COMMUNICATION AND NOTIFICATION SYSTEM WITH BEACON CLUSTERING

This application is a continuation of U.S. application Ser. No. 15/897,114, filed Feb. 14, 2018, which is a continuation of U.S. application Ser. No. 15/845,417, filed Dec. 18, 2017, which is a continuation-in-part of U.S. application Ser. No. 15/627,820, filed Jun. 20, 2017, which is a continuation of U.S. application Ser. No. 15/286,753, filed Oct. 6, 2016, now U.S. Pat. No. 9,691,206, which is a continuation of U.S. application Ser. No. 15/055,477, filed Feb. 26, 2016, now U.S. Pat. No. 9,466,163, which is a continuation-in-part of U.S. application Ser. No. 14/827,222, filed Aug. 14, 2015, now U.S. Pat. No. 9,424,699, which claims priority to and the benefit of U.S. Application Ser. No. 62/037,684, filed Aug. 15, 2014. All applications are incorporated by reference in their entireties for all purposes.

BACKGROUND

Controlled access areas have become increasingly commonplace in modern society. From hospitals to gated communities, sensitive industries to prison complexes, there is a need to control the flow of human capital. Systems for doing so are often rudimentary, such as those that utilize a guard who checks an individual's identification and access rights. Other systems involve physical keycards and passes, which allow access past static checkpoints.

These systems are often insufficient for controlling and tracking the movement of guests who have access for a particular, limited purpose. Once past a static checkpoint, control systems have limited means for tracking a guest's movements. Furthermore, guests may become lost or enter into areas beyond the scope of their invitation.

Additionally, the hospitality industry is highly competitive with companies always looking for competitive advantages, whether it be on price, features or customer service. In recent years, in an effort to differentiate themselves from other competitors, many hospitality companies such as Hotels, Restaurants and Casinos have implemented customer reward and tracking programs. These programs reward customers for a variety of reasons including, but not limited to, spending time at specific locations, spending money at specific locations and/or performing certain activities. Additionally, the reward programs provide a treasure trove of data for the companies on their customers, which assist in marketing efforts, administrative decisions and more.

Current systems require both the customer and company to proactively perform a task in order to be recognized at the location and receive the proper rewards program recognition. Most of the time this is done by the customer handing a card to a company representative and that card information then entered into an existing system. This process is often insufficient for proper tracking of the customer.

It is to addressing or reducing these problems that the current disclosure is directed.

SUMMARY OF THE DISCLOSURE

A method and system are described that allows members (as defined below), system administrators or other authorized individuals access into to controlled access locations; as well as the ability for members and administrators to grant temporary and limited access to guests into these locations. Additionally, the method and system allows for navigational services to be provided to members and guests, and real-time tracking and confirmation to members and administrators that guests have arrived at their destination and did not enter any unauthorized areas.

The disclosed method preferably can work through a system of wireless radio, sound and/or light-based beacons communicating with member and guest's smartphones, computer systems, or other electronic devices. Members and administrators can send one or more temporary electronic access keys to a guest's smartphone or other electronic device. Wireless radio, sound and/or light-based beacons provide an access control & location tracking system with real-time data about the member and guest whereabouts, allowing for the confirmation and tracking described above and below. Depending on the type of location using the system, in certain circumstances one or more members, in addition to guests, also may not have access to all restricted areas at the given location. As a non-limiting example, where the system is used by a condominium ("condo") building and a particular condo owner is delinquent on their Condo Association fees, access to community areas (i.e. exercise rooms, club house, etc.) for the particular condo owner could be restricted, but not the entrance, elevators or garage. As another non-limiting example, commercial buildings may allow a tenant to access the building entrance, elevator for their particular floor and garage, but not other floors of the building.

Certain embodiments disclose a method and system that allow companies (as defined below), to identify a customer's location and provide notification to one or more company representatives upon arrival of the customer at a given location. Additionally, the method and system allow for navigational services to be provided to customers, and real-time location determination, location tracking and confirmation to customers of location and rewards program status.

The disclosed method can be preferably performed through a system of wireless radio, sound and/or light-based beacons communicating with the customer's smartphone, tablet, computer system, or other electronic device. Wireless radio, sound and/or light-based beacons (also collectively referred to as "beacons") provide a system with real-time data about the customer's whereabouts, allowing for the confirmation and tracking described above and below. Depending on the type of location using the system, in certain circumstances one or more functions of the system may not be available to customers and companies alike. As a non-limiting example, where the system is used by a company that provides food and beverage services, a customer can place an order for food/beverages and the order delivered to the person at their current location as determined by the system. As another non-limiting example, a company may choose to implement the notification system to have staff members notified of the arrival of a customer who is assigned to a specific group or list within the system.

The following definitions are provided for a better understanding of the disclosure:

| | |
|---|---|
| Access Control & Location Tracking Database | The electronic database where permissions and locations of guests and members are managed and stored. |
| Access Control & Location Tracking System | The specially programmed computer/electronic system which monitors guest and member authorizations and locations based on information received from and being in communication with wireless |

| | -continued |
|---|---|
| | Radio, Sound and/or Light-based Beacons to monitor activity in controlled access areas. |
| Member/Guest Electronic Computer System or Device | A specially programmed computer system or electronic device including, but not limited to, cell phone, smartphone, key card, tablet, laptop or other computer system belonging to a member, guest, administrator or public service personnel. |
| Access Control & Location Tracking Keychain Database | An electronic database that stores digital access keys sent to a specific member, guest, administrator or public service personnel's device. The keychain database can store digital keys from one or more different access control & location tracking systems and is preferably stored on the member/guest's electronic device which stores the particular member's or guest's keys. This allows the system to be used at multiple locations via a single electronic device app. The other above defined database (Access Control & Location Tracking Database) is preferably provided at each location of installation for the system and stores the keys, member/guest information and access rights for the particular installation of the system. |
| Administrator | One or more persons responsible for the determining who is authorized to enter into a controlled access area and/or one or more persons responsible for entering and maintaining information about each customer in the system and/or system database as well as configuring location, notifications and group/list management for the system and/or system database. |
| Authorized Persons | Persons who have permission to enter a controlled access area. |
| Wireless Radio, Sound and/or Light-based Beacon | A small receiver/transmitter capable of operating on short and/or long range wireless communication between electronic devices. Capabilities include but are not limited to pinpointing its own location, utilizing the software in a smart phone, cellular phone or other electronic device to determine that device's location and bi-directional data transmission. Wireless radio, sound and/or light-based beacons can utilize technologies including, but not limited to, Near Field Communication (NFC), Bluetooth, WiFi, Light-Fidelity (LiFi), Ultrasound, InfraRed (IR), and Radio Frequency (RF). All of these technologies and similar current or similar later developed communication technologies are included in the term "wireless radio" wherever that term appears in this disclosure. |
| Checkpoint | A pre-determined location within a controlled access area where the Access Control & Location Tracking system is programmed to determine whether a member or guest has the necessary credentials to proceed further. |
| Controlled Access Area Or Controlled Access Location | Locations where the general public may not enter without permission from a member or administrator. (e.g. sensitive areas in hospitals, gated communities, prisons, private areas of businesses, apartment buildings). |
| Device | A smartphone, cellular phone, computer, tablet, laptop, smart watch or any electronic device (preferably portable or mobile) with wireless radio, sound and/or Light-based Beacon capability and specifically programmed with at least one embodiment for the below defined "Permissions Application". |
| Guest | An individual with temporary, limited access into all or part of a controlled access area. |
| Key | An electronic or digital code, which is stored in the permissions application. This code is checked against the access control & location tracking database to determine whether a member or guest has permission to be in a controlled access area at a given date and time. |
| Member | An individual with permission to be in a controlled access location, and authority to grant guests access to a controlled access location. |
| Permissions Application | A software based application which retains the permissions for entry into controlled access locations. This application can be run on a smartphone, computer, tablet, or other electronic device. |
| Electronic Identification, Location Tracking, Communication & Notification System Database | An electronic database where permissions and locations of guests and members are managed and stored. |
| Electronic Identification, Location Tracking, Communication & Notification System | A specially programmed electronic system which monitors guest and member authorizations and locations based on information received from and being in communication with wireless radio, sound and/or light-based beacons to monitor activity in controlled access areas. |
| Electronic Identification, Location Tracking, Communication & Notification App | A specially designed software application "App" that is installed on the customer's electronic system or device (preferably portable or mobile electronic device) and which allows and directs the customer's electronic system or device to communicate with wireless radio, sound and/or light-based beacons in order to identify the customer's current location. |

| | |
|---|---|
| Customer | One or more persons who have entered the physical location of, used by or associated with a company or facility and are patrons of the company's business. |
| Facility Staff's Electronic System or Device | A computer system or device (preferably mobile or portable) including, but not limited to, a cell phone, smartphone, key card, tablet, smart watch, laptop or other computer system belonging to a facility that is specially programmed with the Electronic Identification, Location Tracking, Communication & Notification Application and/or which can directly access and communicate with the Electronic Identification, Location Tracking, Communication & Notification System. |
| Customer's Electronic System or Device | A computer system or device (preferably mobile or portable) including, but not limited to, a cell phone, smartphone, key card, tablet, smart watch, laptop or other computer system belonging to a customer that is specially programmed with the Electronic Identification, Location Tracking, Communication & Notification App to permit communication by the Customer's computer system or device with one or more wireless radio, sound and/or light-based beacons. |
| Wireless Radio, Sound and/or Light-based Beacon | A receiver/transmitter, preferably relatively small, capable of operating on short and/or long range wireless communication between electronic devices. Capabilities include, but are not limited to, pinpointing its own location, being programmed or designed to utilize the software in a smart phone, cellular phone, smart watch, or other electronic device to determine that device's location and bi-directional data transmission. Wireless radio, sound and/or light-based beacons can utilize technologies including, but not limited to, Near Field Communication (NFC), Bluetooth, WiFi, Light-Fidelity (LiFi), Ultrasound, InfraRed (IR), and Radio Frequency (RF). All of these technologies and similar current or similar later developed communication technologies are included in the term "wireless radio" wherever that term appears in this disclosure. |
| Location Cluster | A group of Wireless Radio, Sound and/or Light-based Beacons which as a group are utilized in connection with all members of the group in the determination of a customer's location. |

BRIEF DESCRIPTION OF THE DRAWINGS

FIG. 1 is a block diagram of certain non-limiting components of the disclosed access control and location tracking system and also illustrating the steps/communications generally involved in the registration of a member device;

FIG. 2 is a block diagram of certain non-limiting components of the access control and location tracking system and also illustrating the steps/communications generally involved in sending an access key to a guest device;

FIG. 3 is a block diagram of certain non-limiting components of the access control and location tracking system and also illustrating the steps/communications generally involved in determining access rights;

FIG. 4 is a block diagram of certain non-limiting components of the access control and location tracking system and also illustrating the steps/communications generally involved in determining authorized locations;

FIG. 5 is a block diagram of certain non-limiting components of the access control and location tracking system and also illustrating the steps/communications generally involved in determining arrival at authorized locations;

FIG. 6 is a block diagram of certain non-limiting components of the access control and location tracking system and also illustrating the steps/communications generally involved in determining location and navigational support;

FIG. 7 is a block diagram and process flow for access control and the notification rules engines for the disclosed access control and location tracking system;

FIG. 8 is block diagram and process flow for the storage of electronic keys in the keychain database in connection with the disclosed access control and location tracking system;

FIG. 9 is a block diagram of certain non-limiting components of the access control and location tracking system and also illustrating the steps/communications generally involved in sending electronic keys from an electronic device to the access control and location tracking system;

FIG. 10 is a block diagram of certain non-limiting components of the access control and location tracking system and also illustrating the steps/communications generally involved in auto-prompting for selecting an electronic key for sending from an electronic device to the access control and location tracking system;

FIG. 11 is a block diagram of certain non-limiting components of the access control and location tracking system and also illustrating the steps/communications generally involved in auto-prompting and electronic key selection for sending from an electronic device to the access control and location tracking system;

FIG. 12 is a block diagram of certain non-limiting components of the access control and location tracking system and also illustrating the steps/communications generally involved in a guest requesting an electronic key from a member in connection with the access control and location tracking system;

FIG. 15 is a process flow and block diagram illustrating the registration of a customer's device in accordance with one embodiment for the disclosed system and method;

FIG. 16 is a process flow and block diagram illustrating the registration of a beacon location in accordance with one embodiment for the disclosed system and method;

FIG. 17 is a process flow and block diagram illustrating a first embodiment for determining a customer's presence at location by the disclosed system and method;

FIG. 18 is a process flow and block diagram illustrating a second embodiment for determining a customer's presence at location by the disclosed system and method;

FIG. 19 is a process flow and block diagram of a notification rules engine in accordance with one embodiment for the disclosed system and method;

FIG. 20 is a process flow and block diagram illustrating a first embodiment for the determination and delivery of notifications in accordance with one embodiment for the disclosed system and method;

FIG. 21 is a process flow and block diagram illustrating a second embodiment for the determination and delivery of notifications in accordance with one embodiment for the disclosed system and method;

FIG. 22 is a process flow and block diagram illustrating a customer's presence at a location determination rules engine in accordance with one embodiment for the disclosed system and method;

FIG. 23 is a process flow and block diagram illustrating the ordering of goods and/or services in accordance with one embodiment for the disclosed system and method;

FIG. 24 is a process flow and block diagram illustrating the delivery of goods and/or services to a customer's current location in accordance with one embodiment for the disclosed system and method;

FIG. 25 is a process flow and block diagram illustrating a customer opt-out of rating/monitoring by a company in accordance with one embodiment for the disclosed system and method;

FIG. 26 illustrates a sample of a customer presence determination using beacon clustering at a location in accordance with one embodiment for the disclosed system and method;

FIG. 27 is a process flow and block diagram for system determinations for staff and/or visitors;

FIG. 28 is a process flow and block diagram for system determinations for assets;

FIG. 29 is a sample hardware (beacons and electronic devices/tablets) placement illustrating for a location;

FIG. 30 illustrates several non-limiting examples for beacons that can be used with the disclosed system and method;

DETAILED DESCRIPTION

Figure 13:
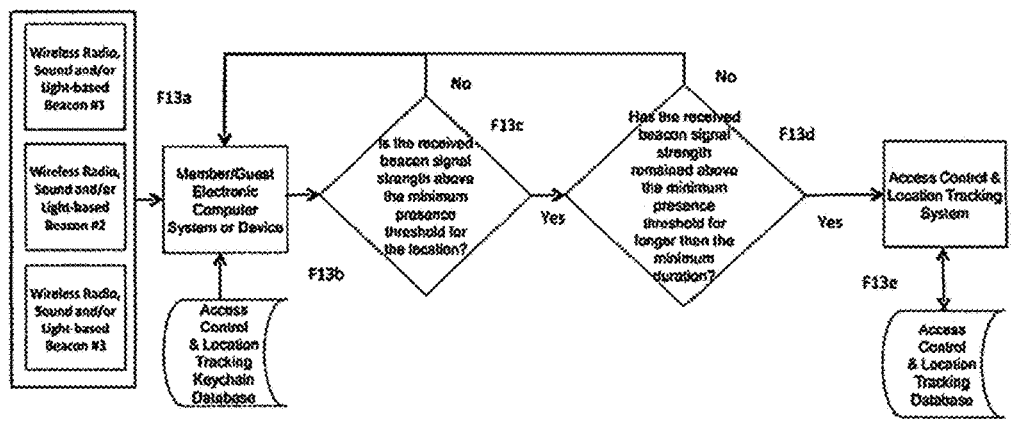
FIG. 13 is a block diagram of certain non-limiting components for determining presence at a specific location and also illustrating the steps/communications generally involved in selecting the appropriate digital key for the specific location.

FIG. 1 shows one method for allowing a member to register their computer system or electronic device with the disclosed access control & location tracking system. This initial registration process preferably allows a member to electronically receive digital/electronic access keys as well as grant a guest access to a controlled access location, and subsequently track the guest's location within that area.

At step F1a, a member registers their electronic computer system or electronic device with the disclosed access control & location tracking system. This enables the member to use their computer system or electronic device to access restricted locations and provide their guests with temporary access to controlled access areas. It also allows the member to use their electronic device to track their guest's location within the controlled access area, and confirm their guest's arrival and departure at a given permitted location. Registration can be accomplished in a number of non-limiting ways. As one non-limiting example, the system administrator can register the members directly through the programmed software using a form and then have the members credentials sent to the member via SMS, MMS, Email, Voice, Mail or other delivery methods. Alternatively, the member can download the software application (app) to their electronic device, register through a form on the app and then the system administrator can approve or deny the registration request. Once the software app is installed on the electronic device and registration is accepted by the system administrator the members digital/electronic keys can be downloaded by the member to the electronic device and stored in their electronic keychain database on their electronic device. The application/database storing the digital/electronic keys then transmits the key to the Access Control & Location Tracking System via any of the wireless radio, light or sound based technologies (wifi, Bluetooth, lifi, rfid, etc.)

At step F1b, the access control & location tracking system is programmed to record permissions afforded to and requested by members and retains and electronically stores those permissions in the Access Control and Tracking Location database. The system utilizes this database's record of members, guests, access rights, locations, and permissions to determine and then grant the level of access to a member, a guest requested by a member, and to provide the real time tracking and confirmation of member and guest movements.

At step F1c, the access control system administrator oversees the access control & location tracking system. Through the system, the administrator can track all member and guest movements, rights, and access. This allows the administrator to employ the necessary level of security or emergency response to protect the safety of members and guests, should a member or guest go beyond the scope of their access. The administrator is notified of the device registration request and can grant or revoke permission to use the registered device. Though not limiting, in the preferred embodiment, the system can be programmed such that the administrator receives device registration requests from a member. The system can also be programmed such that guest registration requests go directly to the member they are requesting access from (though the system can also be programmed to permit the administrator to override, approve and/or cancel decisions made by the member concerning the guest's request).

At step F1d, the access control & location tracking system electronically sends the member's electronic computer system or electronic device the digital access key assigned to them. It also provides the member's electronic computer system or electronic device with real time information on their guest's or other associated/authorized member's whereabouts. This allows the member to confirm that the guest reached their destination.

At step F1e, the digital access key is stored in the electronic keychain database on the member's electronic computer system/device. A similar keychain database on a guest's electronic device is created to store any digital access key(s) granted to a guest through the system.

FIG. 2 illustrates how a member provides a guest access to the controlled access location. The member electronically sends the guest a digital electronic key, which provides the guest with access to a controlled access area limited by the parameters set by the member.

At step F2*a*, a member electronically sends a request to the access control computer system that a digital key be generated and electronically sent to a guest. The member enters any limitations to be placed on the guest's access to the controlled area in the request. An administrator can also be permitted to enter additional access restrictions for the guest. In one non-limiting embodiment, the system can be programmed to provide a form containing a series of checkboxes for each location controlled by the system that the member can select from. A date and time module can also be provided for allowing the member to indicate the starting date and time and ending date and time for the guest's digital key. Further detail on the permissions and limitations a member can place on a key for a guest is discussed in connection with FIG. 7.

At step F2*b*, the access control and location computer system records the member's request and automatically enters it into the access control database. This information is electronically stored and later used by the Access Control & Location Tracking system when the guest receives their access key and enters the secured access location.

At step F2*c*, the access control and location computer system can directly send the guest an electronic key to their smartphone or other electronic device via electronic communication methods including but not limited to direct data connection, SMS, Email, MMS and voice. A confirmation electronic message can be sent to the member to inform them that their guest's key was approved and sent to the guest. Alternatively, the system can be programmed that the guest key is first sent to the member, and the member forwards it to the guest. The key is imported to a software application, which is stored locally on the guest's device. This application acts as an electronic keychain of access keys. In one non-limiting embodiment, the digital key can be an electronic file, which is preferably encrypted. The key can be auto-imported where it is sent to person's electronic device through an app directly that is downloaded on the electronic device or manually added if the key is sent through SMS or email. For the manual method, the guest can click on the file and than have an app import the key to the local device database. Once the guest receives the key, the guest has all access rights, which have been granted to them by a member, as seen/discussed in step F2*a* and FIG. 7. The guest can have a key provided by multiple members within the same Access Control & Location Tracking System location or keys for multiple locations (with separate instances of the Access Control & Location Tracking System). As a non-limiting example, if the guest is a service provider (i.e. plumber, electrician, personal trainer, delivery person, etc.) the guest may need to have keys from multiple members at any given time. Also in some instances a person can be a member at one location and a guest at other locations and may have member key(s) and guest(s) keys on his or her electronic keychain database stored on his or her electronic device.

At step F2*d*, the electronic key is electronically stored in the access control & location tracking keychain database on the guest's device.

FIG. 3 illustrates how the system grants or denies access to a member or guest based on the electronic key on their device.

At step F3*a*, the member or guest attempting to enter a controlled access location will have an electronic key on their device, such as the electronic key the guest receives from the steps described in FIG. 2. Through a wireless radio, sound and/or light enabled application, their device will retrieve all electronic keys stored in the device's keychain database and transmit them to any wireless radio, sound and/or light-based beacons in an immediate proximity to the controlled access area entrance. FIG. 9 shows one non-limiting embodiment where the electronic device can be configured for its owner to manually select the digital key to transmit (i.e. virtual clicker), while FIG. 10 shows another non-limiting embodiment where the electronic device can be configured to auto-sense that it is at a beacon and then have the user manually select the digital key to transmit to the beacon and FIG. 11 shows a further non-limiting embodiment where the electronic device can be configured to automatically sense that it is at a beacon and then automatically send the digital key(s) to the beacon. The member or guest can also choose which specific key to transmit if so configured and desired. The key can be manually chosen via a user interface provided by the software installed on the member's or guest's electronic device or it can also just send all keys available on the users keychain to the system and it will continue to check each key on the keychain to see if one grants them access for the location, date and time. The system can be programmed such that access denial is only given after all available keys are checked. Preferably, the built in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided or later acquired by the electronic device. The Access Control and Location Tracking system, through instructions provided by the programmed software, accesses the radios and other communication hardware available on the electronic device and uses them as needed.

At step F3*b*, the member or guest's device will communicate through wireless radio, sound and/or light-based beacons with the access control and location tracking system. The system will then recognize that a device with the application is in proximity to a controlled access area and retrieve the key(s) stored on said device. As mentioned above, the software can be configured to automatically send the keys or the member/guest can choose which key to send. When the software on the member/guest's electronic device is in range of a beacon, it can receive a signal triggering it to send the keys in its keychain database to the access control & location tracking database.

At step F3*c*, the access control & location tracking system automatically searches though the access control & location tracking database for permissions granted to the member or guest from the provided key. The member or guest will be permitted to enter areas based on these permissions.

At step F3*d*, when a member or guest wishes to enter into a controlled access area, the system will determine whether the member or guest has a valid key allowing entry. If a valid key is presented, access can be granted and an electronic signal is sent to open the access barrier such as a Gate, Door, Elevator or other Entryway. Additionally, notification is electronically sent to Security Staff through a computer screen or other electronic device. The access control & location tracking database is updated with details pertaining to the access event such as the key code, date, time and location.

At step F3*e*, if a valid key is not presented, then access can be denied and notification is sent to Security Staff through a computer screen or other electronic device. The access control & location tracking database is updated with details pertaining to attempted access event including the key code, date, time and location. Optionally, the Access Control and Location Tracking system can be programmed that where a guest or member attempts to enter an area where they are not approved (i.e. when access denied by the system), all of some of the access permissions that they have been granted are suspended or terminated, to permit the administrator or other proper personnel (i.e. security) to investigate the denial (i.e. determine whether it was an accident or that the member/guest has bad motives). The results of the investigation can determine whether the previous permissions are granted again or unsuspended by the system.

FIG. 4 demonstrates how the system determines whether a member or guest is in an authorized or unauthorized location on a continuous basis.

At step F4a, physical wireless radio, sound and/or light-based beacons are placed throughout a controlled access area. These are arranged so that when a member or guest with a wireless radio, sound and/or light enabled device and the permissions application running enters the area, they are preferably constantly within range of a beacon. The member or guests access key can be automatically electronically retrieved from the keychain database stored in their electronic device and transmitted by the wireless radio, sound and/or light-based beacons to the access control & location tracking system preferably in continuous intervals.

At step F4b, the access control & location tracking system receives the access key(s) and compares the key(s) to the access control & location tracking database to determine the permissions afforded to each specific key that is received.

At step F4c, if the member or guest is in an authorized location based on the permissions retrieved in F4b, then the system will update the database to reflect the current location of the member or guest.

At step F4d. If the member or guest is in an unauthorized location, then the system administrator and/or security staff is notified. In the case of a guest, the member who granted the guest access can be notified as well that the guest has gone beyond the parameters of their authorization. The alert is generated by the access control & location tracking system and can be sent through computer, voice, email, IM, SMS, MMS, pager or other communication method. The access control & location tracking database can also be updated with the member or guests current location. Additionally, the termination or suspension of all or some of the guest/member's access permissions as described above can also be performed by the Access Control & Location Tracking system.

FIG. 5 demonstrates how the system determines whether a member or guest has arrived at their authorized location after being granted access into the controlled access area as described in FIG. 3.

At step F5a, physical wireless radio, sound and/or light-based beacons are placed throughout a controlled access area to determine specific locations within the access area. These are arranged so that when a member or guest with a wireless radio, sound and/or light enabled device and the permissions application running enters the area, they are preferably constantly within range of a beacon. The member or guests access key can be automatically electronically retrieved from the keychain database stored in their electronic device and transmitted by the wireless radio, sound and/or light-based beacons to the access control & location tracking system preferably in continuous intervals.

At step F5b, the access control & location tracking system receives the access key(s) as well as location of the device based on which wireless radio, sound and/or light-based beacons received the key and compares the key(s)/location to the access control & location tracking database.

At step F5c, if the access control & location tracking system determines that the location of the member or guest is at the final authorized location based on the permissions retrieved in F5b, then the system will update the database.

At step F5d, if the access control & location tracking system determines that the location of the member or guest is not at the final authorized location within the time allotted based on the permissions retrieved in F5b, then the system administrator and/or security staff is notified. In the case of a guest, the member who granted the guest access can be notified as well that the guest has not arrived at their authorized location within the time period allotted. The alert is generated by the access control & location tracking system and can be sent through computer, voice, email, IM, SMS, MMS, pager or other communication method. The access control & location tracking database is also updated with the member or guests current location.

FIG. 6 demonstrates how the system provides navigational assistance to members and/or guests after being granted access into the controlled access area as described in FIG. 3.

At step F6a, physical wireless radio, sound and/or light-based beacons are placed throughout a controlled access area to determine specific locations within the access area. These are arranged so that when a member or guest with a wireless radio, sound and/or light enabled device and the permissions application running enters the area, they are preferably constantly within range of a beacon. The member or guests access key can be automatically electronically retrieved from the keychain database stored in their electronic device and then transmitted by the wireless radio, sound and/or light-based beacons to the access control & location tracking system in preferably continuous intervals.

At step Fhb, the access control & location tracking system receives the access key(s) as well as location of the device based on which wireless radio, sound and/or light-based beacons received the key and compares the key(s)/location to the access control & location tracking database.

At step F6c, if the access control & location tracking system determines that the location of the member or guest is at the final authorized location based on the permissions retrieved in Fhb, then the system will update the database.

At step F6d, if the access control & location tracking system determines that the location of the member or guest is not at the final authorized location based on the permissions retrieved in F5b, then it updates the access control & location tracking database with the member or guests current location. The system then calculates the possible routes to the final authorized location from the current location of the member or guest. The route information is electronically sent to the member or guests device through computer, voice, email, IM, SMS, MMS, pager or other communication method. Visual interpretation and presentation of the route may also be provided, such as, but not limited to through the electronic device's screen or display. Additionally, the termination or suspension of all or some of the guest/member's access permissions as described above can also be performed by the Access Control & Location Tracking system where the guest/member does not reach a specific location in the allotted or predetermined amount of time.

FIG. 7 demonstrates how a member or system administrator can create a new digital key and assign the specific permissions and notifications for the new digital key. This process can also be utilized to edit permissions and notifications for existing keys.

At step F7a, the "Create New Key" function is selected within the access control & location tracking system by a user with key creation privileges such as a system administrator or member. Preferably, the system administrator or member will have previously signed on or logged in to the system so that their key creation privileges are recognized by the system. Guests are preferably not allowed to create new keys, though such is not considered limiting, and the system can be programmed where a guest could create a key or transfer his or her key to another keychain in certain or limited situations (i.e. husband to wife or vice versa, etc.).

At step F7b, the access control & location tracking system electronically queries the system database to determine existing key recipients as well as available locations, access points, and the rule set assigned to the system administrator or member creating the new key. The user can only create new keys that they themselves have been granted permissions for. As a non-limiting example, if a given user is not allowed access to a specific location, said user would not be able to create a key granting access to that specific location. The screens and options available for creating a key in F7c through F7l are customized based on the granted permissions for the user creating the key. Therefore, another user who has more permissions than the user presented with the options in F7c through F7l could be presented with additional options and screens not shown in F7c through F7l. Similarly, another user who has less permissions may be presented with less than all of the options and screens shown in F7c through F7l. Additionally, the system can be programmed such that the options specified in F7c through F7l work in conjunction with each other, so for example, if a single date is specified along with a specific time span, the key can only be valid for that time span on the specified date.

At step F7c, the user enters or selects the recipient's name and contact information from the list of available recipients retrieved in F7b. The specific data elements entered will depend on the electronic method desired to send the digital key to the recipient. For example if email delivery is selected, then a name and email address is required for the recipient but if an SMS or voice call is selected, a name and phone number for the recipient is required.

At step F7d, the user selects the type of key recipient for this new key. Keys can be created for Members, Guests, Administrators and/or Public Service personnel such as Police, Fire, Utility and Government Agency workers, though such is not considered limiting, and other types of individuals based on status, employment, etc. can also be digital key recipients.

At step F7e, the user specifies the number of times this digital key can be used. Keys can be created for one-time use only, for a specific number of times or for an unlimited number of times.

At step F7f, the user specifies the permissible access dates for the digital key. Keys can be created for a single time span, multiple time spans, or without a time restriction.

At step F7g, the user specifies the permissible access times of day/night for the digital key. Keys can be created for a single time span, multiple time spans, or without a time restriction.

At step F7h, the user specifies the permissible access locations and entry points for the digital key. Keys can be created for a single location/entry point, multiple locations/entry points, or all locations and entry points.

At step F7i, next the user can select if notifications are to be sent related to the usage of this digital key. This function would typically apply to keys generated for guests or public service personnel. If the user does not wish to configure any notifications related to the use of this key, the data and entries for the specific digital key created are saved in the electronic database and steps F7j through F7m are skipped. If they user wishes to create notifications related to the use of this key, then the user can preferably proceed to F7j.

At step F7j, the user selects the type(s) of notifications to be sent. As non-limiting examples, notifications can be sent based on the usage of the key to gain entry to a restricted location, upon arrival at a permitted location, when the key recipient does not arrive at a specific location or if the key recipient has navigated off course from the point of entry to the final authorized location.

At step F7k, the user selects the method(s) of notifications to be sent. Notifications can be sent via SMS/MMS, Email, Voice, or on-screen at the access control & location tracking system or directly through the access control & location tracking system software on the administrator or member's electronic computer system/device.

At step F7l, the user selects or enters the notification recipient(s). Notification recipient(s) can be selected from a list of existing administrators and members or entered with the recipient(s) name and contact information. For example if an email notification is selected, then a name and email address is preferably provided for the recipient but if an SMS or voice call is selected, a name and phone number for the recipient is preferably provided.

At step F7m, the digital key with all permission and notification settings is electronically saved in the system database.

At step F7n, the access control & location tracking system electronically delivers the newly created (or modified) key to the recipient according to the contact information obtained in F7c.

FIG. 8 demonstrates how a member, guest, system administrator or public service personnel can receive digital keys from multiple access control & location tracking systems and store those keys in an electronic keychain database on their electronic computer system or device. The multiple systems can be associated with multiple locations. In one non-limiting example, one location can be residential community 1, the next location condo building 2, the next location a commercial office building. In some instances, the beacons can be used in multiple systems (i.e. lobby of a commercial office building where multiple systems are installed in the building for different companies that have office space in the building, etc.)

At step F8a, one or more access control & location tracking systems generates digital key(s) for a member, guest, administrator or public service personnel as described above. The digital keys are electronically sent to a computer system or device belonging to the member, guest, administrator or public service personnel.

At step F8b, the digital keys sent to the member/guest's electronic computer system or device are electronically stored in the keychain database also stored on the device.

The system can operate similar for members as it does for guests, with the exception that a member can be permitted to create and provide electronic guest keys to others, granting no more than the member's own level of privileges and/or access. Guest can preferably only use the electronic key provided by a member or another authorized user of the system, but preferably cannot create electronic guest keys for other guests or permit another electronic device to use the electronic guest key they were provided with (i.e. cannot forward the electronic guest key to another guest). However, the system can also be programmed to permit a guest to transfer their electronic guest key to another authorized guest already listed in the system (i.e. husband to wife or vice versa, parent to child, etc.), such as where only one guest key is created.

FIG. 9 illustrates how a member or guest would manually choose a key from their device's keychain database to transmit to an access control & location tracking system.

At step F9a, the member or guest attempting to enter a controlled access location will have an electronic key(s) on their device, such as the electronic key(s) the guest receives from the steps described in FIG. 2. The electronic key(s) will be stored in the keychain database on the member's/guest's electronic device. The member or guest opens the Access Control & Location Tracking system application on their electronic device and selects the option to manually transmit a key. The application on the device queries the keychain database on said device to determine which keys are stored and available for transmission.

At step F9b, if no access key has been selected for transmission, the application on the member or guests electronic device will continue to wait for authorization to transmit a selected key.

At step F9c, f the member or guest selects a key and authorizes its transmission, the device will retrieve the selected electronic keys stored in the device's keychain database and transmit it to any wireless radio, sound and/or light-based beacons in an immediate proximity to the controlled access area entrance. Preferably, the built in capabilities of conventional smartphones/electronic devices can be used, as they currently come with Wifi, Bluetooth and sometimes NFC radios or InfraRed sensors, and some also have ultrasonic capable microphones or life built in. If not provided, these technologies can be provided to, downloaded or later acquired by the electronic device. The Access Control and Location Tracking system, through instructions provided by the programmed software, accesses the radios and other communication hardware available on the electronic device and uses them as needed. The software can use any communication hardware (i.e. WiFi radios, Bluetooth radios, NFC radios, LiFi, IR, etc.) that is installed on the electronic device and can use the various hardware as needed to perform the functions of the software.

At step F9d, the member or guest's transmitted key is received through wireless radio, sound and/or light-based beacons and sent to the access control and location tracking system.

At step F9e, the access control & location tracking system automatically searches though the access control & location tracking database for permissions granted to the member or guest from the provided key. The member or guest will be permitted to enter areas based on these permissions.

At step F9f, if a valid key is presented, an electronic notification can be sent back to the member or guest's electronic device through the wireless radio, sound and/or light-based beacon indicating the key was validated and used.

At step F9g, the application on the member or guest's electronic device updates the access control & location tracking keychain database indicating the usage of the key.

At step F9h, if a valid key is not presented, an electronic notification can be sent back to the member or guests' electronic device through the wireless radio, sound and/or light-based beacon indicating the key was not validated and asking the member or guest to select a new key to transmit.

At step F9i, the application on the member or guests' electronic device queries the access control & location tracking system keychain database for any other available keys and the process begins again at F9(b). If no other keys are available, the member or guest can then take steps to request a key as described in FIG. 1 or 12.

FIG. 10 illustrates how a member or guest would manually choose a key from their device's keychain database to transmit to an access control & location tracking system after prompting by a wireless radio, sound and/or light based beacon.

At step F10a, wireless radio, sound and/or light based beacon(s) transmit a signal that is received by the member or guests electronic device. The application installed and running on the member or guests' electronic device will receive the signal from the beacon(s) and prompt, preferably automatically, the member or guest that they are in the proximity of the beacon(s) and to select a key for transmission to the beacon(s).

At step F10b, the member or guest attempting to enter a controlled access location will have an electronic key(s) on their device, such as the electronic key(s) the guest receives from the steps described in FIG. 2. The electronic key(s) will be stored in the keychain database on the device. The member or guest opens the Access Control & Location Tracking system application on their electronic device and selects the option to manually transmit a key. The application on the device queries the keychain database on the device to determine which keys are stored and available for transmission.

At step F10c, if no access key has been selected for transmission, the application on the member or guests electronic device will continue to wait for authorization to transmit a selected key.

At step F10d, if the member or guest selects a key and authorizes its transmission, the device will retrieve the selected electronic keys stored in the device's keychain database and transmit it to any wireless radio, sound and/or light-based beacons in an immediate proximity to the controlled access area entrance. Preferably, the built in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided or later acquired by the electronic device. The Access Control and Location Tracking system, through instructions provided by the programmed software that can be similar to those instructions referenced for FIG. 9, accesses the radios and other communication hardware available on the electronic device and uses them as needed. The software can use any communication hardware (i.e. WiFi radios, Bluetooth radios, NFC radios, LiFi, IR, etc.) that is installed on the electronic device and can use the various hardware as needed to perform the functions of the software.

At step F10e, the member or guest's transmitted key is received through wireless radio, sound and/or light-based beacons and sent to the access control and location tracking system.

At step F10f, the access control & location tracking system automatically searches though the access control & location tracking database for permissions granted to the member or guest from the provided key. The member or guest will be permitted to enter areas based on these permissions.

At step F10g, if a valid key is presented, an electronic notification can be sent back to the member or guest's electronic device through the wireless radio, sound and/or light-based beacon indicating the key was validated and used.

At step F10h, the application on the member or guest's electronic device updates the access control & location tracking keychain database indicating the usage of the key.

At step F10i, if a valid key is not presented, an electronic notification can be sent back to the member or guests' electronic device through the wireless radio, sound and/or light-based beacon indicating the key was not validated and asking the member or guest to select a new key.

At step F10j, the application on the member or guests' electronic device queries the access control & location tracking system keychain database for any other available keys as in F10(b) and the process repeats from that point. If no other keys are available, the member or guest can then take steps to request a key as described in FIG. 1 or 12.

FIG. 11 illustrates how a key from a member or guests' electronic device keychain database is automatically transmitted to an access control & location tracking system after prompting by a wireless radio, sound and/or light based beacon.

At step F11a, wireless radio, sound and/or light based beacon(s) transmit a signal that is received by the member or guests electronic device. The application installed and running on the member or guests' electronic device will receive the signal from the beacon(s) and begin to search for a key to transmit. Each beacon in the system can send out a signal that the application on the electronic device can read. That signal can contain information such as, but not limited to, the name of the beacon, the organization it belongs to and location of the beacon. This same location information can be stored in the keys that are generated.

At step F11b, the member or guest attempting to enter a controlled access location will have an electronic key(s) on their device, such as the electronic key(s) the guest receives from the steps described in FIG. 2. The electronic key(s) will be stored in the keychain database on the device. The member or guest opens or has running, the Access Control & Location Tracking system application on their electronic device and said application is or has previously been configured to automatically transmit a key(s). The application on the device queries the keychain database on said device to determine which keys are stored and available for transmission.

At step F11c, if no access key exists in the database for this location, the member or guest is notified through the access control & location tracking application installed and running on their electronic device. The member or guest can then take steps to request a key as described in FIG. 1 or 12.

At step F11d, if the access control & location tracking system application on the member or guests' electronic device locates a key for the location, it will retrieve the selected electronic key stored in the device's keychain database and transmit it to any wireless radio, sound and/or light-based beacons in an immediate proximity to the controlled access area entrance. In one embodiment for locating the key, the software can compare the location and other information it received from the beacon to search the keychain database. Preferably, the built in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided or later acquired by the electronic device. The Access Control and Location Tracking system, through instructions provided by the programmed software that can be similar to the those instructions referenced for FIG. 9, accesses the radios and other communication hardware available on the electronic device and uses them as needed. The software can use any communication hardware (i.e. WiFi radios, Bluetooth radios, NFC radios, LiFi, IR, etc.) that is installed on the electronic device and can use the various hardware as needed to perform the functions of the software.

At step F11e, the member or guest's transmitted key is received through wireless radio, sound and/or light-based beacons and sent to the access control and location tracking system.

At step F11f, the access control & location tracking system automatically searches though the access control & location tracking database for permissions granted to the member or guest from the provided key. The member or guest will be permitted to enter areas based on these permissions.

At step F11g, if a valid key is presented, an electronic notification can be sent back to the member or guest's electronic device through the wireless radio, sound and/or light-based beacon indicating the key was validated and used.

At step F11h, the application on the member or guest's electronic device updates the access control & location tracking keychain database indicating the usage of the key.

At step F11i, if a valid key is not presented, an electronic notification can be sent back to the member or guests' electronic device through the wireless radio, sound and/or light-based beacon indicating the key was not validated and prompting the access control & location tracking system application to select a new key to transmit.

At step F11j, the application on the member or guests' electronic device queries the access control & location tracking system keychain database for any other available keys as in F11(b) and the process repeats from that point.

FIG. 12 shows one method for allowing a guest to request a key from a member.

At step F12a, a guest opens the access control & location tracking system application on their electronic device. Preferably the software app is previously downloaded electronic device and can be used at various different locations where the system is installed. Furthermore, if the person has used the app in the past for access, the app will already be on their electronic device for subsequent uses whether at the previous location or other locations where the system is installed. Through the application, the guest selects or enters the member information for which the guest would like to request a key from. The guest then selects a button to request a key and a key request is transmitted to the access control & location tracking system through any available form of electronic communication and data transfer including but not limited to through a wireless radio, sound or light enabled beacon, wired or wireless internet connection, voice call, SMS, Email or MMS. Furthermore, other non-limiting examples of ways a guest can request a key from a member include, but are not limited to, through a member name directory similar to a call box a community allows a person to scroll through the names of the residents and a method to contact them. The members' address, phone numbers, email addresses and other information does not need to be shown to the guests in order for the guests to use the system to facilitate communication. The system can also be configured so that the directory can be turned off if desired, or the directed limited to those who are at the same location as the guest. Also, the software can be provided with an address book functionality to store member and guests names for future use, which can be useful for a member who needs to frequently issues keys to the same person or a guest who frequently requests access from specific people.

At step F12b, the access control and location computer system records the guest's request and automatically enters it into the access control & location tracking system database. The Access Control & Location Tracking system also retrieves the member's information so that it may forward the request to the member's electronic device.

At step F12c, the Access Control & Location Tracking system transmits the guest key request to the member's electronic device through any available form of electronic communication and data transfer including but not limited to through a wireless radio, sound or light enabled beacon, wired or wireless internet connection, voice call, SMS, Email or MMS.

At step F12d, a member receives the guest key request and proceeds to enter any limitations to be placed on guest's access to the controlled area in the request. An administrator can also be permitted to enter additional access restrictions for the guest. In one non-limiting embodiment, the system can be programmed to provide a form containing a series of checkboxes for each location controlled by the system that the member can select from. A date and time module can also be provided for allowing the member to indicate the starting date and time and ending date and time for the guest's digital key. Further detail on the permissions and limitations a member can place on a key for a guest is discussed in FIG. 7.

At step F12e, the member transmits the newly created guest key from their electronic device to the Access Control & Location Tracking system through any available form of electronic communication and data transfer including but not limited to through a wireless radio, sound or light enabled beacon, wired or wireless internet connection, voice call, SMS, Email or At step F12f, the Access Control & Location Tracking system receives the guest key and stores it in the Access Control & Location Tracking System Database.

At step F12g, the access control and location computer system can directly send the guest an electronic key to their smartphone or other electronic device via electronic communication methods including but not limited to direct data connection, SMS, Email, MMS and voice. A confirmation electronic message can be sent to the member to inform them that their guest's key was approved and sent to the guest. Alternatively, the system can be programmed that the guest key is first sent to the member, and the member forwards it to the guest. The key is imported to a software application, which can be the same software application referenced in Step 12(a), which is stored locally on the guest's device. This application acts as an electronic keychain of access keys. Once the guest receives the key, the guest has all access rights, which have been granted to them by a member, as seen in F2a, F12d and FIG. 7. The guest can have a key provided by multiple members within the same Access Control & Location Tracking System location or keys for multiple locations (with separate instances of the Access Control & Location Tracking System). As a non-limiting example, if the guest is a service provider (i.e. plumber, electrician, personal trainer, delivery person, etc.) the guest may need to have keys from multiple members at any given time. Also in some instances a person can be a member at one location and a guest at other locations and may have member key(s) and guest(s) keys on his or her electronic keychain database stored on his or her electronic device.

At step F12h, the electronic key is electronically stored in the access control & location tracking keychain database on the guest's device.

FIG. 13 demonstrates how the system determines presence at a location to determine the proper digital key to utilize at a specific location and time.

At step F13a, physical wireless radio, sound and/or light-based beacons are placed throughout a controlled access area to determine specific locations within the access area. These are arranged so that when a member or guest with a wireless radio, sound and/or light enabled device and the permissions application running on their device enters the area, they are preferably constantly within range of a beacon.

At step F13b, the member or guests wireless radio, sound and/or light enabled device queries the keychain database stored in their electronic device to determine what location the device is currently located at. This query is done based on the identification information received by the device from the beacon. Preferably, the beacon, at a minimum, transmits a unique identifier to the device. This allows for the beacon's specific location to be determined or known by the device such that the device determines the proper digital key to retrieve from the keychain database for the specific location. Preferably, the device will also learn or determine what the power and duration configuration settings are for the specific location from the signal transmitted by the beacon for the location and/or from information stored in the keychain database associated with the specific location.

At step F13c, the member or guests wireless radio, sound and/or light enabled device determines what the signal strength is from the received signal transmitted by the wireless radio, sound and/or light-based beacon(s). If the received signal strength, which can be measured in Decibels, Signal Strength Percentage or other non-limiting value, is not above the minimum specified or preprogrammed/preconfigured threshold for a given location as determined in F13b, the member or guests wireless radio, sound and/or light enabled device will continue to scan for signals or transmissions from the wireless radio, sound and/or light-based beacon(s) and will make similar signal strength determinations for subsequent signals/transmissions it receives. If the received signal strength is above the minimum threshold for a given location, the system continues to the next step.

At step F13d, the member or guests wireless radio, sound and/or light enabled device begins a timer to determine the length of time that a wireless radio, sound and/or light-based beacon's signal is received above the minimum signal strength threshold. If the received signal strength falls below the minimum threshold before the minimum duration has elapsed, the member or guests wireless radio, sound and/or light enabled device will continue to scan for signals or transmissions from the wireless radio, sound and/or light-based beacon(s) and will make similar signal strength and/or duration determinations for subsequent signals/transmissions it receives. If the received signal strength remains above the minimum threshold as determined in F13b, for longer than the minimum duration then the member or guests wireless radio, sound and/or light enabled device will transmit the key retrieved n F13b to the access control & location tracking system.

At step F13e, the access control & location tracking system will update the access control & location tracking database regarding valid and/or invalid signal determinations from steps 13c and/or 13d. It can then grant or deny access based upon the configured permissions for the particular member or guest.

Figure 14:
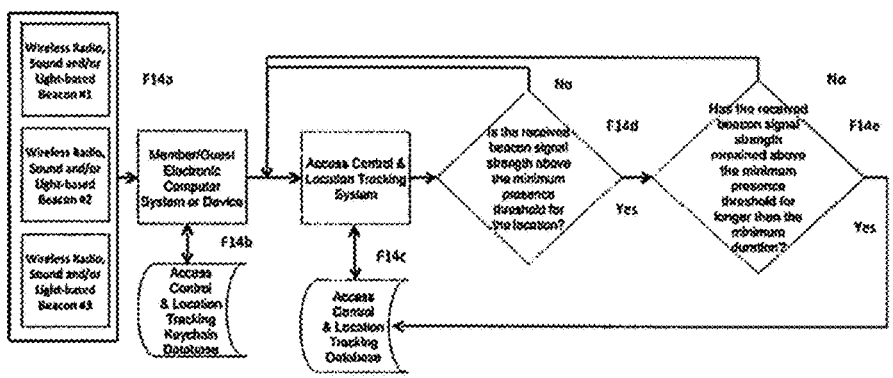
FIG. 14 is a block diagram of certain non-limiting components for determining presence at a specific location and also illustrating another embodiment of the steps/communications generally involved in selecting the appropriate digital key for the specific location.

FIG. 14 demonstrates another method for how the system determines presence at a location to determine the proper digital key to utilize at a specific location and time.

At step F14a, physical wireless radio, sound and/or light-based beacons are placed throughout a controlled access area to determine specific locations within the access area. These are arranged so that when a member or guest with a wireless radio, sound and/or light enabled device and the permissions application running on their device enters the area, they are preferably constantly within range of a beacon.

At step F14b, the member or guests wireless radio, sound and/or light enabled device queries the keychain database stored in their electronic device to determine what location the device is currently located at. This query is done based on the identification information received by the device from the beacon. Preferably, the beacon, at a minimum, transmits a unique identifier to the device. This allows for the beacon's specific location to be determined or known by the device such that the device determines the proper digital key to retrieve from the keychain database for the specific location. Preferably, the device will also learn or determine date and time information.

At step F14c, the member or guests wireless radio, sound and/or light enabled device transmits its identification, location and what the signal strength is from the signal/transmission it received from the wireless radio, sound and/or light-based beacon(s) to the Access Control & Location Tracking System.

At step F14d, The Access Control & Location Tracking System determines what the power and duration configuration settings are for the specific location.

At step F14e, the Access Control & Location Tracking System compares the configured settings retrieved in F14d to the received signal strength being reported by the member or guests wireless radio, sound and/or light enabled device. If the received signal strength, which can be measured in Decibels, Signal Strength Percentage or other non-limiting value, is not above the minimum specified threshold for a given location as determined above, the Access Control & Location Tracking System will continue to scan for signals or transmissions from the member or guests wireless radio, sound and/or light enabled device and will make similar signal strength determinations for subsequent signals/transmissions it receives. If the received signal strength is above the minimum threshold for a given location, the system continues to the next step.

At step F14f, the Access Control & Location Tracking System begins a timer to determine the length of time that a member or guests wireless radio, sound and/or light enabled device is transmitting a received signal strength from the wireless radio, sound and/or light-based beacon(s) above the minimum signal strength threshold. If the received signal strength falls below the minimum threshold before the minimum duration has elapsed, the Access Control & Location Tracking System will continue to scan for signals or transmissions from the member or guests wireless radio, sound and/or light enabled device and will make similar signal strength and/or duration determinations for subsequent signals/transmissions it receives. If the received signal strength is above the minimum threshold for a given location, the system will request that the digital key be sent by the member or guests wireless radio, sound and/or light enabled device to the access control & location tracking system.

At F14g, the member or guests wireless radio, sound and/or light enabled device transmits the digital key to the Access Control & Location Tracking System. It can then grant or deny access based upon the configured permissions for the particular member or guest. The access control & location tracking database can also be updated by the access control & location tracking system regarding valid and/or invalid signal determinations made by the access control & location tracking system.

FIG. 15 shows one method for allowing a customer to register their computer system or device with the electronic identification, location tracking, communication and notification system of a particular company or business. Without limitation, this initial process allows a customer to be electronically and automatically tracked within the company's location, receive rewards program credits, order services delivered to their location and communicate with company employees.

At F15a, a customer downloads and installs the Electronic Identification, Location Tracking, Communication & Notification Application "App" from their computer or any app store or marketplace including, but not limited to, the Apple App Store, Windows Store and Google Play marketplace. The App is downloaded to the customer's electronic system or device. The App can also be preloaded on the Customer's electronic device at the time the customer purchases or otherwise receives the electronic device.

At F15b, when the App is first opened, it preferably prompts the user/customer to register their electronic computer system or device with the electronic identification, location tracking, communication and notification system. This enables the customer to use their computer system or device to be automatically tracked within the customer's facility, communicate with the company, order food, beverage or other products/services, etc. Where the customer is interested in ordering food, beverage and/or other products or services, a menu or listing of the food, beverage and other products/services offered at the location can be displayed on the customer's electronic system or device to inform the customer of what is available at the location. If the user opens the App and does not wish to register the device, then the App can be programmed to operate in a non-registered mode that can limit the services available to the user/customer on the device.

At F15c, if the customer would like to register the device with the electronic identification, location tracking, communication and notification system, a form can appear on the screen prompting the customer for information including, but not limited to, one or more of the following: their name, birthday, mailing address, email address, phone number and picture. The system and software can also be designed such that multiple electronic systems and devices are associated with one account so that the rewards given to each electronic system or device are accumulated within one account (i.e. smartphones of a husband and wife and their children associated with one account so that all points or rewards earned based on activities of the family are accumulated into one account). The required fields can be selected by the company and can depend on the specific company and needs of that company. The customer electronically submits/transmits the form when completed.

At F15d, if during submission by the customer, the App determines that not all required fields are filled out, it will prompt the customer for the missing information. The user can resubmit the form with the missing information provided.

At F15e, once all required fields are provided and the form is submitted by the customer, the data is sent to the electronic identification, location tracking, communication and notification system for processing.

At F15f, the electronic identification, location tracking, communication and notification system electronically stores the customers form submissions along with some identifying information for the customer's device such as, but not limited to, one or more of the following: the device name, UUID, MAC address, IP Address, or other unique identifiers for the customer's device. The information submitted by the customer and the customer's device's identifying information can all be electronically stored in the electronic identification, location tracking, communication and notification database.

At F15g, an electronic notification can be sent to the system administrator(s) via email, sms, mms, voice, fax or other electronic method of the new customer registration.

At F15h, the system administrator can access the electronic identification, location tracking, communication and notification system to view and edit/update the new customer's profile. The system administrator can assign the customer to any group or list available, create notification rules for the customer or add information about the customer in its profile.

At F15i, the system administrator's edits/updates to the customer's profile can be stored in the electronic identification, location tracking, communication and notification database.

FIG. 16 illustrates a preferred embodiment for how a location is registered with the electronic identification, location tracking, communication and notification system.

At F16a, a system administrator configures either a single or cluster of wireless radio, sound and/or light-based beacon (s) with information including, but not limited to, one or more of the following its name, unique identifier (MAC Address, UUID or similar), group/organization, unique number within an organization, location, wireless networks, etc. A cluster of beacons is created when two or more beacons are grouped together to define a single location. The system administrator can select various options with regards to what the system should do when it does not receive a signal from a beacon assigned to a given location cluster. Options include, but are not limited to, discarding the particular location from a presence determination if a signal from one or more of the beacons configured for the cluster associated with the particular location is not received, assigning a default or static value for the beacon signal strength for any beacon that is assigned to the particular cluster that didn't send a signal or a signal of sufficient strength (threshold), or ignoring the beacon from consideration in the presence determination. Location determination for a cluster of beacons can based on an average of the signal strength received by a device and/or system from all of the beacons assigned to a given cluster of a location and subject to the option specified above.

Preferably, the clustering method can be designed to enable micro-location services (i.e. be able to provide accurate location at a sub-room level). In one non-limiting example, the distances of the clusters can preferably range from about a few feet radius to about a 15 feet radius. The beacons for the cluster can be placed anywhere from right next to each other up to a few feet apart, depending on the level of accuracy needed for the given use. In the casino world, a non-limiting example can be three beacons at each blackjack/card table to form the cluster for that table. Clusters can be defined from a logical perspective as a specific location (i.e. Blackjack Table 1, Blackjack Table 2, etc.). From a technical perspective, the beacon clusters can be defined by using their UUID, Major and Minor values (identifiers). All beacons in a cluster preferably has the same UUID and Major value with each one having a unique minor value.

At F16b, the configured wireless radio, sound and/or light-based beacon(s) are physically installed at the configured/assigned location(s) and tested to ensure its (their) operability.

At F16c, a system administrator then electronically accesses the electronic identification, location tracking, communication and notification system to enter in the installed wireless radio, sound and/or light-based beacon(s)' configuration and location information. Alternatively, this information can be electronically received from the beacon signals and electronically downloaded by the system. Beacon clusters can be defined at this point as well. When a location is created, the user inputs the number of beacons used to define that specific location. When a cluster of beacons is configured for a location, the system preferably uses the average of the received signal strengths for all beacons in a cluster in determining location or presence at a location. As a non-limiting example, if a location is configured for a cluster of 3 beacons, the signal strength received from each of the beacons is averaged to create a single location signal strength value. Optionally, should a beacon signal not be received for any given beacon assigned to a location cluster, the system can either assign a dummy value for this particular beacon signal, choose to ignore all beacons for this location or only calculate the average based on the beacons who did provide a signal. Additional configuration of the beacon(s) can also be performed at this step, which can include, but is not limited to, configuring notification settings, signal types, signal strengths, transmission power and device presence durations.

At F16d. the wireless radio, sound and/or light-based beacon's configuration and location information can be stored in the electronic identification, location tracking, communication and notification database.

FIG. 17 illustrates one embodiment of how the system determines the location of a customer based on their registered device.

At F17a, the wireless radio, sound and/or light-based beacons installed at various locations are constantly and automatically broadcasting their information including, but not limited to, one or more of the following: its name, unique identifier (MAC Address, UUID or similar), group/organization, unique number within an organization, location, wireless networks, etc.

At F17b, the customer's electronic system or device with the Electronic Identification, Location Tracking, Communication & Notification Application "App" downloaded and running (either in the foreground or as a background service) receives the broadcasted information from the wireless radio, sound and/or light-based beacons and transmits the information received, along with additional information including, but not limited to, one or more of the following: the customer's or the customer's device's name, unique identifier (MAC Address, UUID or similar), group/organization, signal type and strength to the Electronic Identification, Location Tracking, Communication & Notification system. This process repeats at configurable intervals so that the App can be frequently transmitting beacon information to the Electronic Identification, Location Tracking, Communication & Notification System.

At F17c, the Electronic Identification, Location Tracking, Communication & Notification System queries the Electronic Identification, Location Tracking, Communication & Notification Database to determine the location and other settings configured in F2c for each of the configured beacons information sent by the App on the customer's device.

At F17d, the Electronic Identification, Location Tracking, Communication & Notification System analyzes the data received from the App and compares it against the retrieved configuration settings (See FIG. 8) for each wireless radio, sound and/or light-based beacon location it received information from. If the customer's device is not considered present at a location based on the analysis of the Electronic Identification, Location Tracking, Communication & Notification System, it will continue to check the next data set received from the App and repeat this step. As a non-limiting example, the signal strength, which in this instance can be measured and calculated on a scale of 0 to 100% can be configured to a minimum threshold of 80% as in F8c. This means that unless the customer's device receives a signal from the wireless radio, sound and/or light-based beacons greater then the 80% strength threshold, they cannot be considered present at a location. Additionally, a minimum signal strength duration value may be specified for a given location as in F8d. If so configured, once the App on a customer's electronic system or device reports a signal strength value above the minimum threshold, it preferably must also continue to report a signal strength value above that minimum threshold for the configured duration threshold in order to be considered present at that location. Continuing from the example above, if this minimum duration threshold is set to 20 seconds, the App must continue to report a signal strength value above the 80% value for a duration of 20 consecutive seconds in order to consider the customer's electronic system or device present at that location. Signal strength can be measured in terms of decibels or rssi. For decibels, the receiving device (phone, tablet, etc) can simply measure the signal strength in db. Also, a fixed value can be configured for the transmit power strength of the beacons and that power level (in db) can be used in the calculation of the RSSI (relative signal strength indicator) which is an industry standard measurement algorithm that factors in the received signal strength in Db and compares it against the known transmit power.

At F17e, if the analysis performed in F3d indicates that the customer's device is present at a given location, the status of that customer's device is updated with that location (s) information. The location determinations can also be stored in the Electronic Identification, Location Tracking, Communication & Notification database.

At F17f, the Electronic Identification, Location Tracking, Communication & Notification Database prompts or provides information to the Electronic Identification, Location Tracking, Communication & Notification System of the location confirmation so that any notification rules specified for that location and/or customer can be executed by the system.

FIG. 18 illustrates a different embodiment of how the system determines the location of customer based on their registered device.

At F18a, the customer's electronic system or device with the Electronic Identification, Location Tracking, Communication & Notification Application "App" downloaded and running is preferably constantly and automatically broadcasting it's information including, but not limited to, one or more of the following the customer or customer's device' name, unique identifier (MAC Address, UUID or similar), group/organization, unique number within an organization, location, wireless networks, etc.

At F18b, the wireless radio, sound and/or light-based beacons installed at various locations receive the broadcasted information from the App on the customer's device and transmits the information received, along with additional information including, but not limited to, one or more of the following the beacon's name, unique identifier (MAC Address, UUID or similar), group/organization, signal type and strength to the Electronic Identification, Location Tracking, Communication & Notification system. This process repeats at configurable intervals so that the App can be frequently transmitting beacon information to the Electronic Identification, Location Tracking, Communication & Notification System.

At F18c, the Electronic Identification, Location Tracking, Communication & Notification System queries the Electronic Identification, Location Tracking, Communication & Notification Database to determine the location and other settings configured in F2c for each of the beacons information sent by the App on the customer's device.

At F18d, the Electronic Identification, Location Tracking, Communication & Notification System analyzes the data received from the App and compares it against the retrieved configuration settings (See FIG. 8) for each wireless radio, sound and/or light-based beacon location it received information from. If the customer's device is not considered present at a location based on the analysis of the Electronic Identification, Location Tracking, Communication & Notification System, it will continue to check the next data set received from the App and repeat this step. As a non-limiting example, the signal strength, which in this instance can be measured and calculated on a scale of 0 to 100% can be configured to a minimum threshold of 80% as in F8c. This means that unless the customer's device receives a signal from the wireless radio, sound and/or light-based beacons greater then the 80% strength threshold, they cannot be considered present at a location. Additionally, a minimum signal strength duration value may be specified for a given location as in F8d. If so configured, once the App on a customer's electronic system or device reports a signal strength value above the minimum threshold, it must continue to report a signal strength value above that minimum threshold for the configured duration threshold in order to be considered present at that location. Continuing from the example above, if this minimum duration threshold is set to 20 seconds, the App must continue to report a signal strength value above the 80% value for a duration of 20 consecutive seconds in order to consider the customer's electronic system or device present at that location.

At F18e, if the analysis performed in F4d indicates that the customer's device is present at a given location, the status of that customer's device is updated with that location (s) information. The location determinations can also be stored in the Electronic Identification, Location Tracking, Communication & Notification database.

At F18f, the Electronic Identification, Location Tracking, Communication & Notification Database prompts or provides information to the Electronic Identification, Location Tracking, Communication & Notification System of the location confirmation so that any notification rules specified for that location and/or customer can be executed.

FIG. 19 demonstrates a non-limiting preferred embodiment for how notifications can be configured within the Electronic Identification, Location Tracking, Communication & Notification System. This process can also be utilized to edit profile information and notifications for existing customers.

At F19a, the Electronic Identification, Location Tracking, Communication & Notification System queries the Electronic Identification, Location Tracking, Communication &

Notification Database for the desired customer's existing information. This function can be typically reserved for a system administrator.

At F19b, the Electronic Identification, Location Tracking, Communication & Notification System can display the retrieved customer's profile information and verifies the accuracy of the information. The system administrator may also enter new and/or updated information in the customer's profile if so desired.

At F19c, once the customer's profile information is verified and/or updated (where a verification or updating step is performed), the system administrator may add the customer to one or more groups or lists maintained within the system. The system may also allow for default groups/lists to be assigned to all customers of a facility.

At F19d, once the groups and/or lists are selected, the system administrator has the option of sending notifications upon confirmation of their presence as described in FIGS. 3 and/or 4, at any location configured in the Electronic Identification, Location Tracking, Communication & Notification System. If no notifications are desired, the customer's profile information is updated in the Electronic Identification, Location Tracking, Communication & Notification Database.

At F19e, if the system administrator desired to configure notifications for the customer they will now configure the notification recipient(s) and type of notification to be sent upon confirmation of their presence as described in FIGS. 3 and/or 4, at any location configured in the Electronic Identification, Location Tracking, Communication & Notification System. More than one notification can be configured for a given customer.

At F19f, the customer's profile information is updated in the Electronic Identification, Location Tracking, Communication & Notification Database along with the configured notification settings.

FIG. 20 demonstrates how the system determines if a notification is to be delivered, where the notification is to be delivered and how the notification is to be delivered.

At F20a, the customer's electronic system or device with the Electronic Identification, Location Tracking, Communication & Notification Application "App" downloaded and running (either in the foreground or as a background service) can be constantly and automatically broadcasting it's information including, but not limited to, one or more of the following the customer's and/or customer's device's name, unique identifier (MAC Address, UUID or similar), group/organization, unique number within an organization, location, wireless networks, etc.

At F20b, the wireless radio, sound and/or light-based beacons installed at various locations receive the broadcasted information from the App on the customer's device and transmit the information received, along with additional information including, but not limited to, signal type and strength to the Electronic Identification, Location Tracking, Communication & Notification system. This process repeats at configurable intervals so that the beacons are frequently transmitting and automatically customer device information to the Electronic Identification, Location Tracking, Communication & Notification System. In the embodiment shown in FIG. 20, the phone can perform the broadcasting of its identifiers which can be the exact same type of identifiers as in other figures and the beacons can act as receivers for that signal. The notification determinations and delivery shown in FIG. 21 and discussed below, can work similar to F17b in FIG. 17, while FIG. 20 shows how the system can be used in a different manner.

At F20c, the Electronic Identification, Location Tracking, Communication & Notification System queries the Electronic Identification, Location Tracking, Communication & Notification Database in order to receive information to allow it to determine the settings configured in F16c for each of the beacons sent information by the App on the customer's device.

At F20d, the Electronic Identification, Location Tracking, Communication & Notification System analyzes the data received from the App and compares it against the retrieved configuration settings (See FIG. 22) for each wireless radio, sound and/or light-based beacon location it received information from. If the customer's device is not considered present at a location based on the analysis of the Electronic Identification, Location Tracking, Communication & Notification System, it will continue to check the next data set received from the App and repeat this step. As a non-limiting example, the signal strength, which in this instance can be measured and calculated on a scale of 0 to 100% was configured to a minimum threshold of 80% as in F22c. This means that unless the customer's device receives a signal from the wireless radio, sound and/or light-based beacons greater then the 80% strength threshold, they cannot be considered present at a location. Additionally, a minimum signal strength duration value may be specified for a given location as in F8d. If so configured, once the App on a customer's electronic system or device reports a signal strength value above the minimum threshold, it must continue to report a signal strength value above that minimum threshold for the configured duration threshold in order to be considered present at that location. Continuing from the example above, if this minimum duration threshold is set to 20 seconds, the App must continue to report a signal strength value above the 80% value for a duration of 20 consecutive seconds in order to consider the customer's electronic system or device present at that location.

At F20e, if the analysis performed in F20d indicates that the customer's device is present at a given location, the system determines if the user is a member of a group or list. If the user is not a member of a group or list, no notifications related to the group or list are sent and the status of that customer's device is updated with that locations information. However, other non-group or list related notifications (i.e. drink specials, gift shop discounts, etc.) can be set electronically sent to the customer's device.

At F20f, if the customer is determined to be a member of a group or list based on the analysis performed in F20e, the system next determines what, if any, notifications are configured for the group or list. If notifications are not configured for the group or list the customer is assigned to, no notifications are sent and the status of that customer's device is updated with that locations information. However, other non-group or list related notifications (i.e. drink specials, gift shop discounts, etc.) can be set electronically sent to the customer's device.

At F20g. if notifications are configured for the user based on the analysis in F20f, the Electronic Identification, Location Tracking, Communication & Notification Database is updated so the notifications can be queued up.

At F20h, the Electronic Identification, Location Tracking, Communication & Notification Database prompts the Electronic Identification, Location Tracking, Communication & Notification System to send out the configured notifications.

At F20i, notifications are sent out by the Electronic Identification, Location Tracking, Communication & Notification System via any of the available and configured methods. These methods include, but are not limited to, one or more of the following: Email, SMS, MMS, On Screen and Voice. The notifications are designed to inform specific staff members or departments of the facility when specific customers arrive at the location. One non-limiting example of a notification can be a SMS message sent to a Host that one of their VIP customers arrives at the facility. Another non-limiting example notification can be a popup window on a computer screen for the security department when someone tagged on a Watch List arrives at the facility. By having the novel system described herein installed, a company or organization can have staff members or management be notified when certain classes of customers or specific customers arrive at their place of business.

FIG. 21 demonstrates another embodiment of how the system determines if a notification is to be delivered, where the notification is to be delivered and how the notification is to be delivered.

At F21a, the wireless radio, sound and/or light-based beacons installed at various locations are constantly and automatically broadcasting information including, but not limited to, its name, unique identifier (MAC Address, UUID or similar), group/organization, unique number within an organization, location, wireless networks, etc.

At F21b, the customer's electronic system or device with the Electronic Identification, Location Tracking, Communication & Notification Application "App" downloaded and running (either in the foreground or as a background service) receives the broadcasted information from the wireless radio, sound and/or light-based beacons and transmits the information received, along with additional information including, but not limited to, one or more of the following: the customer's name and/or the customer's device's name, unique identifier (MAC Address, UUID or similar), group/organization, unique number within an organization, signal type and strength to the Electronic Identification, Location Tracking, Communication & Notification system. This process repeats at configurable intervals so that the customer's device is frequently transmitting beacon information to the Electronic Identification, Location Tracking, Communication & Notification System.

Thus, as evident by the above Figures, the system can be designed such that sometimes the beacons communicate with the system and other times the customer's electronic device communicates with the system.

At F21c, the Electronic Identification, Location Tracking, Communication & Notification System queries the Electronic Identification, Location Tracking, Communication & Notification Database to determine the settings configured in F2c for each of the locations and/or beacons information sent by the App on the customer's device.

At F21d, the Electronic Identification, Location Tracking, Communication & Notification System analyzes the data received from the App and compares it against the retrieved configuration settings (See FIG. 8) for each wireless radio, sound and/or light-based beacon location it received information from. If the customer's device is not considered present at a location based on the analysis of the Electronic Identification, Location Tracking, Communication & Notification System, it will continue to check the next data set received from the App and repeat this step. As a non-limiting example, the signal strength, which in this instance can be measured and calculated on a scale of 0 to 100% was configured to a minimum threshold of 80% as in F8c. This means that unless the customer's device receives a signal from the wireless radio, sound and/or light-based beacons greater then the 80% strength threshold, they cannot be considered present at a location. Additionally, a minimum signal strength duration value may be specified for a given location as in F8d. If so configured, once the App on a customer's electronic system or device reports a signal strength value above the minimum threshold, it must continue to report a signal strength value above that minimum threshold for the configured duration threshold in order to be considered present at that location. Continuing from the example above, if this minimum duration threshold is set to 20 seconds, the App must continue to report a signal strength value above the 80% value for a duration of 20 consecutive seconds in order to consider the customer's electronic system or device present at that location.

At F21e, if the analysis performed in F7d indicates that the customer's device is present at a given location, the system determines if the user is a member of a group or list. If the user is not a member of a group or list, no notifications related to the group or list are sent and the status of that customer's device is updated with that locations information. However, other non-group or list related notifications (i.e. drink specials, gift shop discounts, etc.) can be set electronically sent to the customer's device.

At F21f, if the customer is determined to be a member of a group or list based on the analysis performed in F21e, the system next determines what, if any, notifications are configured for the group or list. If notifications are not configured for the group or list the customer is assigned to, no notifications are sent and the status of that customer's device is updated with that locations information. However, other non-group or list related notifications (i.e. drink specials, gift shop discounts, etc.) can be set electronically sent to the customer's device.

At F21g, if notifications are configured for the user based on the analysis in F21f, the Electronic Identification, Location Tracking, Communication & Notification Database is updated so the notifications can be queued up.

At F21h, based on information stored in the Electronic Identification, Location Tracking, Communication & Notification Database the Electronic Identification, Location Tracking, Communication & Notification System is prompted to send out the configured notifications.

At F21i, notifications are sent out by the Electronic Identification, Location Tracking, Communication & Notification System via any of the available and configured methods. These methods include, but are not limited to, Email, SMS, MMS, On Screen and Voice. The notifications are designed to inform specific staff members or departments of the facility when specific customers arrive at the location. One non-limiting example of a notification can be a SMS message sent to a Host that one of their VIP customers arrives at the facility. Another non-limiting example notification is a popup window on a computer screen for the security department when someone tagged on a Watch List arrives at the facility.

FIG. 22 demonstrates how a customer's presence at a location is determined and configured within the Electronic Identification, Location Tracking, Communication & Notification System. This process can also be utilized to edit presence determination configurations already stored in the database.

At F22a, the Electronic Identification, Location Tracking, Communication & Notification System queries the Electronic Identification, Location Tracking, Communication & Notification Database for a list of available locations. Available locations can be ones that are entered into the system database as described in FIG. 2. Configuring refers to setting parameters for a location to assign a beacon or beacon cluster to a particular location as well as to aid in the determination of presence at that location based on signal strength and duration. This function can be typically reserved for a system administrator, though such is not considered limiting.

At F22b, the Electronic Identification, Location Tracking, Communication & Notification System displays a listing of available locations to configure. The system administrator or other authorized individual can then select the location to configure or edit the configuration of. Reconfiguring the location can be for a variety of reasons, such as, but not limited to, adding additional beacons to a location cluster for better accuracy, replace a beacon that is faulty, or changing the presence determination criteria to make the system more or less sensitive/accurate.

At F22c, once the location is selected, the system administrator may now specify the number of beacons assigned to this particular location. A location can consist of one or more beacons, clustered together.

Figure 31:
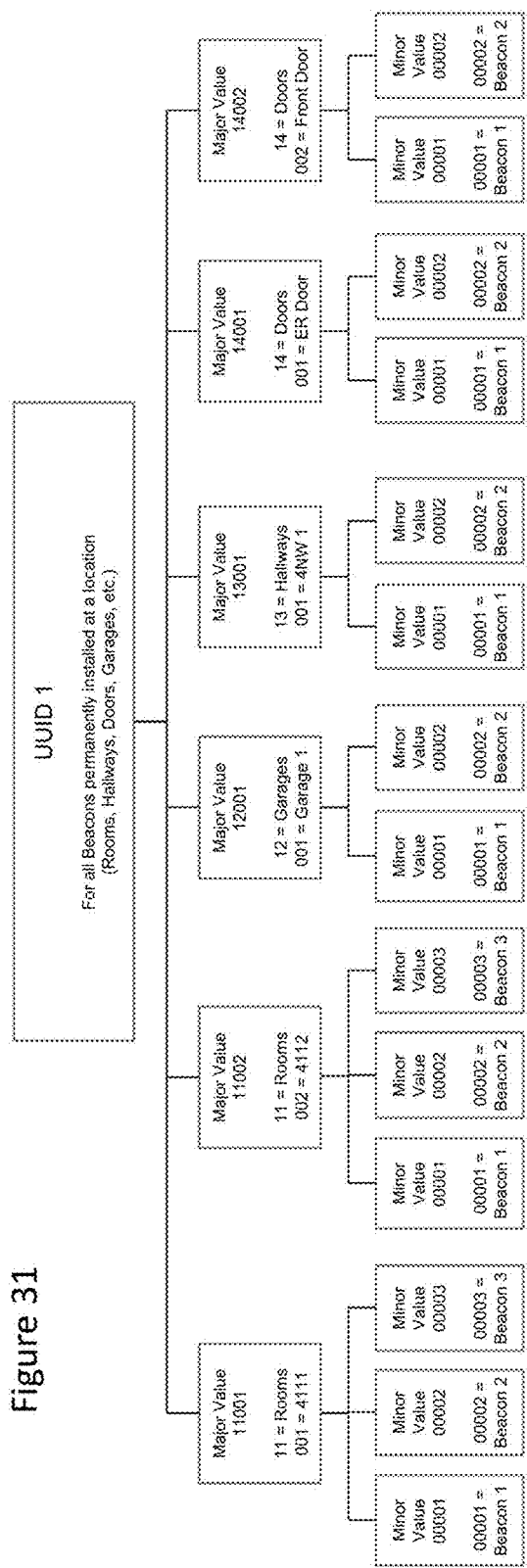
FIG. 31 is a block diagram of a non-limiting example for a beacon structure for a hospital using fixed location beacons.
Figure 32:
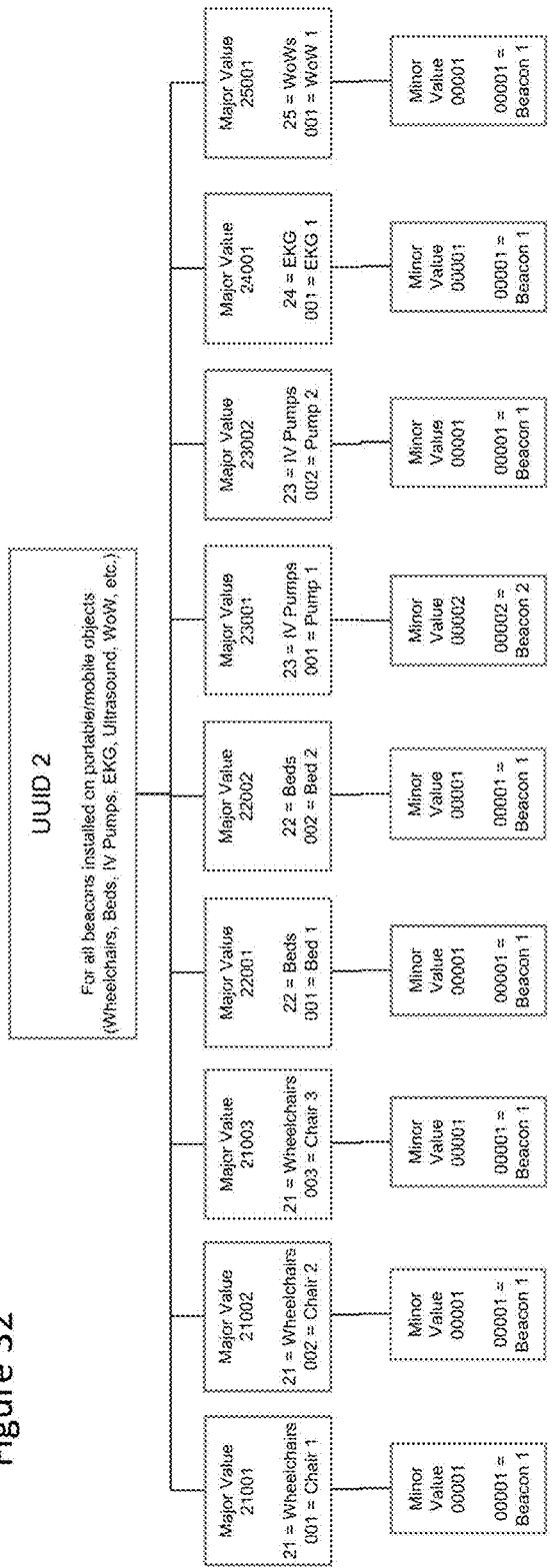
FIG. 32 is a block diagram of a non-limiting example for a beacon structure for a hospital using mobile asset tags.

Next, at F22d, the system administrator may now specify the Unique Identifiers for the beacons to be identified with this location. As a non-limiting example, if three beacons are configured for this location cluster, then 3 beacon identifiers must be selected to belong to this location cluster. If only a single beacon is selected then a single unique identifier is assigned to the particular location. Location can be identified by using matching identifiers on the beacons with only a single differentiator. In one embodiment, 3 identifying fields can be used for each beacon, UUID, Major Value and Minor Value. Each beacon can have values assigned to each of those 3 fields. As a non-limiting example, a 3 beacon cluster could have each beacon with a UUID of 121324-34235-342345-34423 and a major id value of 12345. Then beacon 1 in the cluster would have a minor value of 1, beacon 2 would have a minor value of 2 and beacon 3 would have a minor value of 3 (or some other differing numbering, lettering, characters or other indicia). The next cluster could have 3 beacons with the same UUID as above but with a different major value. See FIG. 31 as a non-limiting example for configuring beacons.

Next, at F22e, the system administrator may now select what the system should do when it does not receive a signal from a beacon assigned to a given location cluster. Non-limiting options include, but are not limited to, discarding this location from the presence determination if a signal from all beacons configured for the cluster is not received, assigning a default or static value for the beacon signal strength for any beacon that is assigned to the particular cluster but didn't receive a signal, or ignoring the beacon from consideration in the presence determination.

Next, at F22f, the system administrator may specify the Unique Identifiers for minimum signal strength threshold for a customer to be considered present at this particular location. This signal strength is the measure of the strength of a known wireless radio, sound and/or light-based beacons transmitted signal strength as received by the customer's electronic system or device or vice-versa for the embodiments that the customer's electronic device contains a beacon that transmits a signal and the wireless radio, sound and/or light-based beacons are provided with receivers for receiving the transmitted beacon signal sent from the customer's electronic device. As a non-limiting example, the signal strength can be measured and calculated on a scale of 0 to 100% where the minimum signal strength threshold is set to 80%. This means that unless the customer's device receives a signal from the wireless radio, sound and/or light-based beacons greater then the 80% strength threshold, they will not be considered present at a location (or vice versa where the customer's device sends a beacon signal and the cluster of beacons contain received for receiving the beacon signal of the customer's device). Though it is preferred that the beacons are of the same type for a particular cluster, it is within the scope of the disclosure to have a location cluster made up beacons of differing types (i.e. Bluetooth beacon, a light-based beacon and a sound based beacon). The signal strength measurement is intended to approximate the distance between the customer's electronic system or device and the wireless radio, sound and/or light-based beacons and can also include strength indicators including but not limited to RSSI (relative signal strength indicator) values. As mentioned above, RSSI is a signal strength indicator based on an industry standard algorithm that factors into account the known signal transmission power level.

At F22g, once the minimum presence signal strength threshold has been entered, the system administrator has the option of specifying the minimum presence duration for that location. The minimum presence duration is a time value and can be expressed in any known and acceptable time format including but not limited to milliseconds, seconds, minutes and hours. As a non-limiting example, the system administrator can configure the value to 20 seconds. In this instance the customer's electronic system or device must report to the Electronic Identification, Location Tracking, Communication & Notification system a signal strength above the minimum threshold specified in F22c for a period of at least 20 consecutive seconds in order to consider the customer's electronic system or device present at that location.

At F22h, the location's presence determination configuration profile is updated in the Electronic Identification, Location Tracking, Communication & Notification Database.

FIG. 23 demonstrates how a customer is able to order goods and/or services from within the Electronic Identification, Location Tracking, Communication & Notification Application on their electronic system or device.

At F23a, the customer opens the App on their electronic system or device and selects the order Goods/Services button, option or link. The App displays all available Goods and/or Service types available for the facility. The customer selects the type of good(s) and/or service(s) desired.

At F23b, the App then displays a menu of available goods and/or services for purchase in that category to the customer. The customer can select a single good or service, select multiple goods and/or services, enter in a free text request, initiate an audio or video session with a facility staff member, and/or use any other available method to select the goods and/or services desired.

At F23c, the customer's order is electronically transmitted to the Electronic Identification, Location Tracking, Communication & Notification System.

At F23d, the Electronic Identification, Location Tracking, Communication & Notification System queries the Electronic Identification, Location Tracking, Communication & Notification Database for the notification method associated with this category or good and/or service.

At F23e, the Electronic Identification, Location Tracking, Communication & Notification System notifies the appropriate person or department for the category of goods and/or services ordered by the customer of the order and any information provided by the customer.

FIG. 24 demonstrates how a facility is able to deliver goods and/or services ordered by a customer from within the Electronic Identification, Location Tracking, Communication & Notification Application on the customer's electronic system or device to the current location of the customer at the time of delivery.

At F24a, a facility staff member uses an electronic system or device to access the Electronic Identification, Location Tracking, Communication & Notification System at the time the good(s) and/or service(s) is (are) ready to be delivered to the customer.

At F24b, the Electronic Identification, Location Tracking, Communication & Notification System queries the Electronic Identification, Location Tracking, Communication & Notification Database for the current location of the customer who placed the order. The current location is determined as in FIGS. 17 and/or 18 and is constantly being updated within the Electronic Identification, Location Tracking, Communication & Notification System.

At F24c, the Electronic Identification, Location Tracking, Communication & Notification System then returns the current location of the customer to the Facility staff member's electronic system or device. In the event the customer moves from the location provided to the facility member's device, an alert or updated location information for the customer can be automatically transmitted to the facility staff member's device so that the staff member is provided with the new location for the customer.

FIG. 25 demonstrates how a customer is able to opt-out of being rated/monitored from within the Electronic Identification, Location Tracking, Communication & Notification Application on the customer's electronic system or device.

At F25a, when the Electronic Identification, Location Tracking, Communication & Notification System makes a determination that a customer's electronic system or device is present at a given location as described in FIGS. 17 and/or 18, a notification can be sent to the customer's electronic system or device via the Electronic Identification, Location Tracking, Communication & Notification Application "App" indicating the that their presence has been detected at a given location by the Electronic Identification, Location Tracking, Communication & Notification System. The notification can be made through a variety of methods including but not limited to Email, SMS, MMS, On Screen and Voice.

At F25b, the customer through the App running on their electronic system or device is presented with or can select a menu item to opt-out of being rated/monitored/tracked by the facility. If the customer does not make an affirmative selection to opt-out of being rated/monitored/tracked or makes an affirmative selection to allow rating/monitoring/tracking then the Electronic Identification, Location Tracking, Communication & Notification System can be electronically notified so that customer rating/monitoring/tracking can continue. Alternatively, the system can be programmed for the opposite scenario, such that an affirmative selection must be entered in order to opt-in to being rated/monitored/tracked.

At F25c, if the customer makes an affirmative selection to Opt-Out of being rated/monitored/tracked (or Opt-In in the alternative scenario), then the Electronic Identification, Location Tracking, Communication & Notification System is electronically notified of such selection.

At F25d, the Electronic Identification, Location Tracking, Communication & Notification System updates the Electronic Identification, Location Tracking, Communication & Notification Database of the customers' selection in F25b or F25c.

At F25e, for those customers who made the affirmative selection to Opt-Out of being monitored, the Electronic Identification, Location Tracking, Communication & Notification System queries the Electronic Identification, Location Tracking, Communication & Notification Database to determine if the customer is a member of the Opt-Out Group or List as configured in FIG. 19 for that customer and if so, what the notification settings are for the given customer.

At F25f, for customers determined to be part of the Opt-Out group or list, a notification is sent via the method configured for the customer and group type in FIG. 19.

FIG. 26 demonstrates one non-limiting embodiment of how a cluster of beacons can be assigned to a location and used for location determination within the Electronic Identification, Location Tracking, Communication & Notification System.

At F26a, beacons are installed and configured for four locations, Table A, Table B, Table C and Table D. Each table has 3 beacons configured in the cluster. It should be recognized that a table is just one of many non-limiting examples of where the beacons are located or associated with. Other non-limiting examples of beacon locations are rooms, booths, halls, doorways and even specific areas within a room.

At F26b, a customer with the Electronic Identification, Location Tracking, Communication & Notification Application on the customers' electronic system or device sits down at Table A as illustrated or otherwise positions him or herself at Table A.

At F26c, the Electronic Identification, Location Tracking, Communication & Notification Application on the customers' electronic system or device receives beacon signals from all nearby beacons and sends them to the Electronic Identification, Location Tracking, Communication & Notification System. As a non-limiting example, the signal strength measurements for each beacon is displayed in the chart on the figure. The Electronic Identification, Location Tracking, Communication & Notification System calculated a signal average for each location based on all of the beacon signal strengths received.

At F26d, the Electronic Identification, Location Tracking, Communication & Notification System makes a determination on presence at the location of Table A based on a higher average signal strength received from the beacons in the Table A location cluster then the average signal strength received from the beacons in the other location clusters. Preferably, the system continuously monitors for the customer's location. However, it is within the scope of the disclosure to provide for a configurable setting for how frequently the system checks for beacons, which can be, without limitation, anywhere from about every second to about every 30 seconds. Periodic checking, as opposed to continuous monitoring, would provide for lower battery usage on the phone/electronic device.

Certain embodiments the one or more beacons transmit their respective signals for receipt by a receiver within the customer/end user's electronic device. For the embodiments described above where the wireless signal is sent by customer/end user's electronic device and received by one or more beacons located in the premises, the customer's electronic device also has or acts as a beacon (transmits a wireless signal) and each of the one or more beacons located on the premises is provided with its own receiver for receiving the signal from the electronic device. Where the customer's electronic device acts as receiver, the App can be used to filter or disregard received signals that are below the preconfigured signal strength threshold and/or are not above the preconfigured signal strength threshold for the preconfigured duration of time. In this situation, the App can be programmed only to electronically send information to the Electronic Identification, Location Tracking, Communication & Notification System ("System") for the signals satisfying the preconfigured signal strength threshold or the preconfigured signal strength threshold and preconfigured duration of time. Where the customer's electronic device transmits the signal to the plurality of beacons located on the premises, the beacons preferably electronically send all of the information to the System and any filtering or disregarding of any of the signals is determined by the System and not prior to being sent to the System.

In certain embodiments, the system that performs the above described functions and steps can include several components including, but not necessarily limited to:
1. One or more Wireless Radio, Sound and/or Light-based Beacon(s)
2. One or more member/guest electronic computer system or device(s)
3. Access Control & Location Tracking System
4. Access Control & Location Tracking System Database
5. Access Control & Location Tracking Keychain Database
6. A public or private computer network to connect or communicate the beacons and Access Control & Location tracking system and database with each other.

The various components can be in electrical and wireless communication with each other.

The ability to electronically monitor guest and member access to controlled areas will provide significant administrative and financial benefits incident to operators of controlled access locations. Without limitation, these include the following benefits:
1. Provide members with the ability to remotely allow guests entry, rather than necessitating the transfer of a physical object such as a keycard or conventional mechanical key.
2. Provide guests with real-time mapping and navigation in buildings and neighborhoods.
3. Allow members to confirm their guests have arrived and departed.
4. Reduce security costs by allowing increased automation of security systems.
5. Increase safety in controlled access locations by providing real-time data on the presence of unauthorized persons.
6. Provide public safety personnel with access to controlled locations in emergency or other necessary situations.

In other embodiments, the system that performs the above described functions and steps can include several components including, but not necessarily limited to, the following:
1. One or more Wireless Radio, Sound and/or Light-based Beacon(s)
2. One or more customer electronic computer system or device(s)
3. Electronic Identification, Location Tracking, Communication & Notification System
4. Electronic Identification, Location Tracking, Communication & Notification Database
5. A public or private computer network to connect or communicate the customer's device, beacons and Electronic Identification, Location Tracking, Communication & Notification system and database with each other.

The various components can be in electrical and wireless communication with each other.

As one non-limiting example, the ability to electronically identify customers, track customer movements and notify providers of hospitality services of the presence of desired customers will provide significant administrative and financial benefits incident to operators of hospitality venues. Without limitation, these include the following benefits:
1. Provide hospitality service providers the ability to identify a customer and the customer's precise location within their facility.
2. Provide customers with real-time mapping and navigation in buildings and hospitality venues.
3. Provide hospitality service providers the ability to receive notifications when selected customers are present in their facility.
4. Analyze customer levels and behavior so as to tailor or modify service offerings and maximize profitability.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the system and method has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:
1. A system for determining a current location of an individual at a particular geographical area, comprising:
a plurality of wireless beacons with subsets of the wireless beacons disposed at different geographical locations within the particular geographical area, each of the plurality of wireless beacons transmitting a wireless signal with each signal having an unique identifier identifying which beacon from the plurality of wireless beacons transmitted such signal;

a software app running on an electronic device on the possession of the individual while the individual is at the geographical area; the software app allowing the electronic device to receive one or more wireless signals from all wireless signals being transmitted by the plurality of wireless beacon; and an electronic system in communication with the electronic device, the electronic system receiving information from the electronic device regarding at least some of the one or more wireless signals received by the electronic device, wherein the electronic system programmed to determine the current location of the individual at the particular geographical area using the information received from the electronic device.

2. The system for determining of claim 1 wherein the software App determines a signal strength for each of the received wireless signals and the electronic device only forwards information for received wireless signals having signal strengths above a preconfigured signal strength threshold.

3. The system for determining of claim 1 further comprising an electronic database having configuring information for each of the beacons from the plurality of beacons stored therein; the electronic database in communication with the electronic system, wherein the electronic system queries the electronic database to receive some or all of the configuring information.

4. The system for determining of claim 3 wherein the configuring information includes minimum signal strength thresholds for the wireless signal transmitted by each beacon in order for the beacon to be considered in a determination for a current location of the individual by the electronic system.

5. The system for determining of claim 4 wherein the software App or the electronic system disregarding wireless signals received by the individual's electronic device having a signal strength that are below the minimum signal strength threshold for their associated beacon.

6. The system for determining of claim 5 wherein the electronic system is programmed to determine the current location for the individual within the particular geographic area using information for only wireless signals received by the electronic device having signal strengths above the minimum signal strength threshold.

7. The system for determining of claim 1 wherein the particular geographical area is a hospitality location.

8. The system for determining of claim 3 wherein the electronic system is programmed to identify the received wireless signal with a highest signal strength from the received one or more wireless signals and to obtain location information for the associated beacon which sent the signal with the highest signal strength from the electronic.

9. The system for determining of claim 8 wherein the electronic system is programmed to select the location of the beacon which sent the wireless signal with the highest signal strength as a current location for the individual within the particular geographical area.

10. The system for determining of claim 7 wherein the electronic system is programmed to electronically send a notification to an electronic device of a staff member employed at the hospitality location regarding a presence and a current location of the individual within the hospitality location.

11. The system of claim 7 wherein each subset of the plurality of beacons comprises two or more of the plurality of beacons to form a plurality of beacon clusters, with each beacon cluster containing beacons not in any of the other beacon clusters; wherein an average signal strength value for each beacon cluster based on the beacons contained in each cluster is obtained for location determinations.

12. The system of claim 11 wherein an average signal strength for a beacon cluster is determined by (i) averaging signal strengths for the received signals for all of the beacons in the beacon cluster, (ii) assigning a dummy value for signal strengths below the preconfigured signal strength threshold sent from a beacon in the beacon cluster and then averaging all signal strengths above the threshold and the dummy value assigned, or (iii) averaging only signal strengths above the preconfigured signal strength threshold from beacons in the beacon cluster.

13. The system for determining of claim 12 wherein the received signals having a signal strength over the preconfigured threshold are only electronically forwarded by the App to the System only where the signal strength remains above the preconfigured signal strength threshold for a preconfigured duration of time.

14. The method for determining of claim 11 wherein each beacon cluster defining a specific location within the particular geographic area and the beacon cluster having the highest average signal strength identifies the specific location of the individual within the particular geographic area.

* * * * *